United States Patent
Heon et al.

(10) Patent No.: US 12,202,313 B2
(45) Date of Patent: Jan. 21, 2025

(54) REAR SUSPENSION ASSEMBLY FOR AN OFF-ROAD VEHICLE

(71) Applicant: BOMBARDIER RECREATIONAL PRODUCTS INC., Valcourt (CA)

(72) Inventors: Martin Heon, Sherbrooke (CA); William Bombardier, Sherbrooke (CA); Daniel Leclerc, St-Denis-de-Brompton (CA); Bruno Girouard, Shefford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/029,485

(22) PCT Filed: Sep. 30, 2021

(86) PCT No.: PCT/IB2021/059022
§ 371 (c)(1),
(2) Date: Mar. 30, 2023

(87) PCT Pub. No.: WO2022/070144
PCT Pub. Date: Apr. 7, 2022

(65) Prior Publication Data
US 2023/0364957 A1  Nov. 16, 2023

Related U.S. Application Data

(60) Provisional application No. 63/085,739, filed on Sep. 30, 2020.

(51) Int. Cl.
*B60G 3/20* (2006.01)
*B60G 7/00* (2006.01)
(Continued)

(52) U.S. Cl.
CPC ............. *B60G 3/202* (2013.01); *B60G 7/001* (2013.01); *B60G 7/005* (2013.01); *B60G 7/008* (2013.01);
(Continued)

(58) Field of Classification Search
CPC ........ B60G 3/202; B60G 7/001; B60G 7/005; B60G 7/008; B60G 7/02; B60G 21/0551;
(Continued)

(56) References Cited

U.S. PATENT DOCUMENTS 8,328,212 B1 * 12/2012 Dundon .................. B60G 3/20
280/124.135
8,875,830 B2    11/2014 Massicotte et al.
(Continued)

FOREIGN PATENT DOCUMENTS

| JP | 2007022250 A | 2/2007 |
|---|---|---|
| WO | 2018033768 A1 | 2/2018 |
| WO | 2020089837 A1 | 5/2020 |

OTHER PUBLICATIONS

Melior, Inc.; Steering and Suspension Systems Study Guide; Apr. 30, 2014; https://www.slideshare.net/prashantingale351/studyguide-suspension-and-steering and provided by the ISA/US with the ISR dated Jan. 21, 2022, pp. 1, 33 and 34.
(Continued)

*Primary Examiner* — Drew J Brown
(74) *Attorney, Agent, or Firm* — BCF LLP

(57) ABSTRACT

A vehicle including: a frame; front suspension assemblies and wheels; a rear left suspension assembly connected to the frame; a rear right suspension assembly connected to the frame; rear wheels having a wheel axis and an inner rim radius; a rear gear train; and a motor. Each rear suspension assembly including a swing arm; a shock assembly; a knuckle including: a first portion connected to a wheel hub,
(Continued)

and a second portion extending upward from the first portion; a first link having an outward end connected to the first portion and an inward end connected to the frame; and a second link having an outward end connected to the second portion and an inward end connected to the frame, the outward end of the second link being distanced from the corresponding wheel axis by a distance greater than the inner rim radius.

26 Claims, 25 Drawing Sheets

(51) Int. Cl.
*B60G 7/02* (2006.01)
*B60G 21/055* (2006.01)
*B60K 5/00* (2006.01)

(52) U.S. Cl.
CPC ............ *B60G 7/02* (2013.01); *B60G 21/0551* (2013.01); *B60G 2200/182* (2013.01); *B60G 2200/422* (2013.01); *B60G 2204/1224* (2013.01); *B60G 2204/128* (2013.01); *B60G 2204/143* (2013.01); *B60G 2204/148* (2013.01); *B60G 2204/416* (2013.01); *B60G 2206/11* (2013.01); *B60G 2206/50* (2013.01); *B60G 2300/07* (2013.01); *B60K 5/00* (2013.01)

(58) Field of Classification Search
CPC ........ B60G 2200/182; B60G 2200/422; B60G 2204/1224; B60G 2204/128; B60G 2204/143; B60G 2204/148; B60G 2204/416; B60G 2206/11; B60G 2206/50; B60G 2300/07; B60G 2200/1442; B60G 2200/466; B60G 2202/312; B60G 2204/129; B60G 2204/4302; B60G 15/065; B60G 3/20; B60K 5/00; B62D 21/11; B62D 21/183

See application file for complete search history.

(56) References Cited

U.S. PATENT DOCUMENTS

| | | | |
|---|---|---|---|
| 9,981,519 B2 | 5/2018 | Despres-Nadeau et al. | |
| 10,442,264 B2 | 10/2019 | Mailhot et al. | |
| 11,046,176 B2* | 6/2021 | Danielson | B60K 17/24 |
| 11,643,035 B2* | 5/2023 | Kotrla | B60G 3/20 |
| | | | 293/117 |
| 11,648,813 B2* | 5/2023 | Li | B60G 7/04 |
| | | | 280/788 |
| 2006/0186628 A1 | 8/2006 | Mcconville et al. | |
| 2009/0008890 A1 | 1/2009 | Woodford | |
| 2012/0031688 A1* | 2/2012 | Safranski | B60G 3/20 |
| | | | 280/124.135 |
| 2015/0061275 A1* | 3/2015 | Deckard | B62D 21/183 |
| | | | 280/124.135 |
| 2016/0347137 A1* | 12/2016 | Despres-Nadeau | B60G 3/202 |
| 2017/0136874 A1* | 5/2017 | Harris | B60G 3/185 |
| 2018/0264902 A1* | 9/2018 | Schroeder | F16C 11/0619 |
| 2019/0193501 A1 | 6/2019 | Brady et al. | |
| 2020/0025275 A1 | 1/2020 | Schroeder et al. | |
| 2020/0130048 A1 | 4/2020 | Hosoi et al. | |

OTHER PUBLICATIONS

Super 7th Heaven; Steering Axis Inclination, Sep. 17, 2014; https://web.archive.org/web/20200920052405/www.super7theaven.co.uk/glossary/steering-axis-inclination/ and provided by the ISA/US with the ISR dated Jan. 21, 2022.

International Search Report of PCT/IB2021/059022 issued from the ISA/US; Kari Rodriguez; Jan. 21, 2022.

Office Action issued from the Chinese Patent Office on Nov. 15, 2023 in connection with the corresponding Application No. 202180066611.4.

* cited by examiner

REAR SUSPENSION ASSEMBLY FOR AN OFF-ROAD VEHICLE

CROSS-REFERENCE

The present application claims priority to U.S. Provisional Patent Application No. 63/085,739, entitled "Rear Suspension Assembly for an Off-Road Vehicle," filed on Sep. 30, 2021, the entirety of which is incorporated herein by reference.

FIELD OF TECHNOLOGY

The present technology relates to rear suspension assemblies for off-road vehicles.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

To be able to operate in off-road conditions, a side-by-side off-road vehicle needs to be able to handle bumpy terrain and to operate on various surfaces including, but not limited to, sand, dirt and mud. These conditions represent unique challenges not typically encountered when designing on-road vehicles such as a car.

One such challenge is that the suspension assemblies need to have a large amount of travel to handle the bumpy terrain. However, as the wheels move up and down with the suspension assemblies, strain can be induced on the frame at points where the suspension assemblies connect. If the stress is substantial and concentrated over a small portion of the frame, the frame could be negatively affected.

Thus there is a desire for a suspension assembly suitable for the operating conditions of side-by-side off-road vehicles.

SUMMARY

It is an object of the present technology to ameliorate at least some of the inconveniences present in the prior art.

According to aspects of the present technology, there is provided a vehicle with rear suspension assemblies including a knuckle for connecting the rear wheel to a swing arm. The knuckle includes a lower portion connected to the wheel and a wheel hub, as well as an upper portion extending generally upward from the lower portion. The knuckle and the vehicle frame are pivotally connected together via two links. One link extends from the lower portion of the knuckle and connects to a lower portion of the frame. The other link extends from a top end of the knuckle and connects to a higher portion of the frame. In this way, connections between the rear suspension assemblies and the frame are spaced out and stress induced by those connections is thus spread over a larger area compared to arrangements with both links connecting to the wheel near the wheel hub.

According to one aspect of the present technology, there is provided a vehicle including a frame; a driver seat connected to the frame; a front left suspension assembly connected to the frame; a front left wheel operatively connected to the front left suspension assembly; a front right suspension assembly connected to the frame; a front right wheel operatively connected to the front right suspension assembly; a rear left suspension assembly connected to the frame; a rear left wheel operatively connected to the rear left suspension assembly, the rear left wheel having a left wheel axis, the rear left wheel including: a rear left rim having an inner rim radius, and a rear left tire mounted to the rear left rim; a rear right suspension assembly connected to the frame; a rear right wheel operatively connected to the rear right suspension assembly, the rear right wheel having a right wheel axis, the rear right wheel including: a rear right rim having the inner rim radius, and a rear right tire mounted to the rear right rim; a rear gear train operatively connected to the rear left wheel and the rear right wheel; and a motor operatively connected to the rear gear train, the motor driving the rear right wheel and the rear left wheel via the rear gear train, each of the rear left suspension assembly and the rear right suspension assembly comprising: a swing arm having a front end pivotally connected to the frame; a shock absorber assembly pivotally connected to the swing arm at a first end and pivotally connected to the frame at a second end; a knuckle pivotally connected to a rear portion of the swing arm, the knuckle including a first portion connected to a wheel hub, the wheel hub being operatively connected to a corresponding one of the rear right wheel and the rear left wheel, and a second portion connected to and extending generally upward from the first portion; a first link having a laterally outward end pivotally connected to the first portion of the knuckle and a laterally inward end pivotally connected to the frame; and a second link having a laterally outward end pivotally connected to the second portion of the knuckle and a laterally inward end pivotally connected to the frame, the laterally outward end of the second link being distanced from a corresponding one of the right wheel axis and the left wheel axis by a distance greater than the inner rim radius.

In some implementations, the vehicle further includes a third link having: a laterally outward end pivotally connected to the swing arm; and a laterally inward end pivotally connected to the frame.

In some implementations, the first link, the second link, and the third link connect to the frame rearward of the rear gear train.

In some implementations, the first link and the third link are disposed rearward of the rear gear train.

In some implementations, the vehicle further includes a sway bar assembly including: a sway bar; a right link having a bottom end pivotally connected to the swing arm of the rear right suspension assembly and a top end pivotally connected to a right end of the sway bar; and a left link having a bottom end pivotally connected to the swing arm of the rear left suspension assembly and a top end pivotally connected to a left end of the sway bar.

In some implementations, the sway bar includes: a central portion arranged generally horizontally left to right, a right portion extending generally forward from a right end of the central portion, and a left portion extending generally forward from a left end of the central portion; and the central portion of the sway bar is pivotally connected to a rear portion of the frame.

In some implementations, the frame further includes a connection bracket disposed above the rear gear train and the sway bar; and the laterally inward end of the second link of each of the right and left suspension assemblies are connected to the connection bracket.

In some implementations, the right link of the sway bar assembly and the left link of the sway bar assembly are disposed forward of the rear gear train.

In some implementations, for the rear right suspension assembly, the right link of the sway bar connects to the swing arm forward of the first end of the shock absorber assembly; and for rear left suspension assembly, the left link of the sway bar connects to the swing arm forward of the first end of the shock absorber assembly.

In some implementations, the frame further comprises a connection bracket disposed higher than the rear gear train; and the laterally inward end of the second link of each of the right and left suspension assemblies are connected to the connection bracket.

In some implementations, for each of the rear left suspension assembly and the rear right suspension assembly, the knuckle is connected to the swing arm by a first ball joint and a second ball joint.

In some implementations, the first ball joint is disposed higher than the wheel axis; and the second ball joint is disposed lower than the wheel axis.

In some implementations, for each of the rear left suspension assembly and the rear right suspension assembly, a top end of the second portion of the knuckle and the laterally outward end of the second link are disposed vertically higher than the corresponding one of the rear right wheel and the rear left wheel.

In some implementations, for each of the rear left suspension assembly and the rear right suspension assembly, the second portion of the knuckle extends vertically along an interior side of the corresponding one of the rear right wheel and the rear left wheel.

According to another aspect of the present technology, there is provided a rear suspension assembly for supporting a wheel of a vehicle. The rear suspension assembly includes a swing arm having a front end configured for pivotally connecting to a frame of the vehicle; a shock absorber assembly pivotally connected to the swing arm at a first end, the shock absorber assembly being configured for pivotally connecting to the frame at a second end; a knuckle pivotally connected to a rear portion of the swing arm, the knuckle including: a first portion configured for connecting to a wheel hub, and a second portion connected to and extending generally upward from the first portion; a first link having a laterally outward end pivotally connected to the first portion of the knuckle and a laterally inward end configured for pivotally connecting to the frame; and a second link having a laterally outward end pivotally connected to the second portion of the knuckle and a laterally inward end configured for pivotally connecting to the frame, the laterally outward end of the second link being distanced from a wheel axis of the wheel by a distance greater than an inner rim radius of the wheel.

In some implementations, the first portion of the knuckle defines an aperture therein for receiving the wheel hub; the aperture has an aperture axis; and the aperture axis is aligned with the wheel axis.

In some implementations, an upper part of the first portion of the knuckle is pivotally connected to the swing arm at a first point; and a lower part of the first portion of the knuckle is pivotally connected to the swing arm at a second point.

In some implementations, a distance between the aperture axis and the laterally outward end of the second link, as connected to the second portion, is greater than half of a distance between the first point and the second point.

In some implementations, the assembly further includes a third link having: a laterally outward end pivotally connected to the swing arm; and a laterally inward end configured for pivotally connecting to the frame.

In some implementations, the knuckle is connected to the swing arm by two ball joints.

In some implementations, the knuckle is connected to the swing arm by a first ball joint and a second ball joint; the first ball joint is disposed below the wheel axis; and the second ball joint is disposed above the wheel axis.

In some implementations, the second portion of the knuckle extends first upward, then inward, and subsequently upward from the first portion of the knuckle.

In some implementations, a top end of the second portion of the knuckle forms a bracket; the bracket extends slightly outward from remaining parts of the second portion; and the laterally outward end of the second link is a pivotally connected to the bracket.

According to another aspect of the present technology, there is provided a vehicle including a frame; a driver seat connected to the frame; a front left suspension assembly connected to the frame; a front left wheel operatively connected to the front left suspension assembly; a front right suspension assembly connected to the frame; a front right wheel operatively connected to the front right suspension assembly; a rear left suspension assembly connected to the frame; a rear left wheel operatively connected to the rear left suspension assembly, the rear left wheel having a left wheel axis, the rear left wheel including: a rear left rim having an inner rim radius, and a rear left tire mounted to the rear left rim; a rear right suspension assembly connected to the frame; a rear right wheel operatively connected to the rear right suspension assembly, the rear right wheel having a right wheel axis, the rear right wheel including: a rear right rim having the inner rim radius, and a rear right tire mounted to the rear right rim; a rear gear drive operatively connected to the rear left wheel and the rear right wheel; and a motor operatively connected to the rear drive assembly, the motor driving the right rear wheel and the left rear wheel via the rear drive assembly, each of the rear left suspension assembly and the rear right suspension assembly comprising: a swing arm having a front end pivotally connected to the frame; a shock absorber assembly pivotally connected to the swing arm at a first end and pivotally connected to the frame at a second end; a knuckle pivotally connected to a rear portion of the swing arm, the knuckle including: a first portion at least partially housed in the corresponding one of the rear right rim and the rear left rim, and a second portion extending upward from the first portion, a top end of the second portion being vertically higher than the corresponding one of the rear right rim and the rear left rim; and at least one link having a laterally outward end pivotally connected to the knuckle and a laterally inward end pivotally connected to the frame, the laterally outward end of the at least one link being distanced from a corresponding one of the right wheel axis and the left wheel axis by a distance greater than the inner rim radius.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale, unless otherwise indicated.

DETAILED DESCRIPTION

The present technology will be described with respect to a four-wheel off-road vehicle 10 having two side-by-side seats and a steering wheel. However, it is contemplated that some aspects of the present technology may apply to other types of vehicles such as, but not limited to, off-road vehicles having a handlebar and a straddle seat (i.e. an all-terrain vehicle (ATV)) and off-road vehicles having more or less than four wheels.

Figure 1:
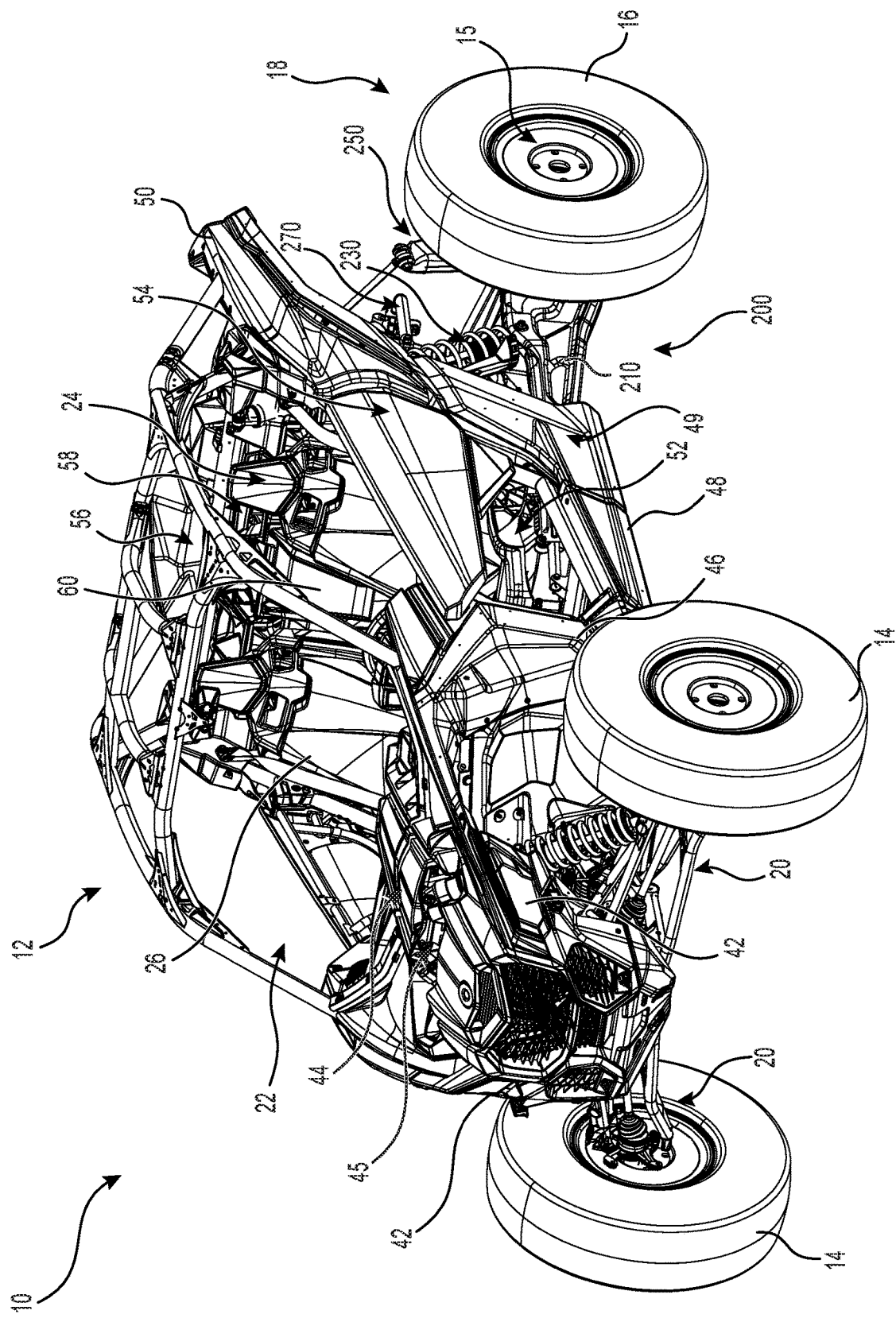
FIG. 1 is a top, front, left side perspective view of an off-road vehicle.
Figure 2:
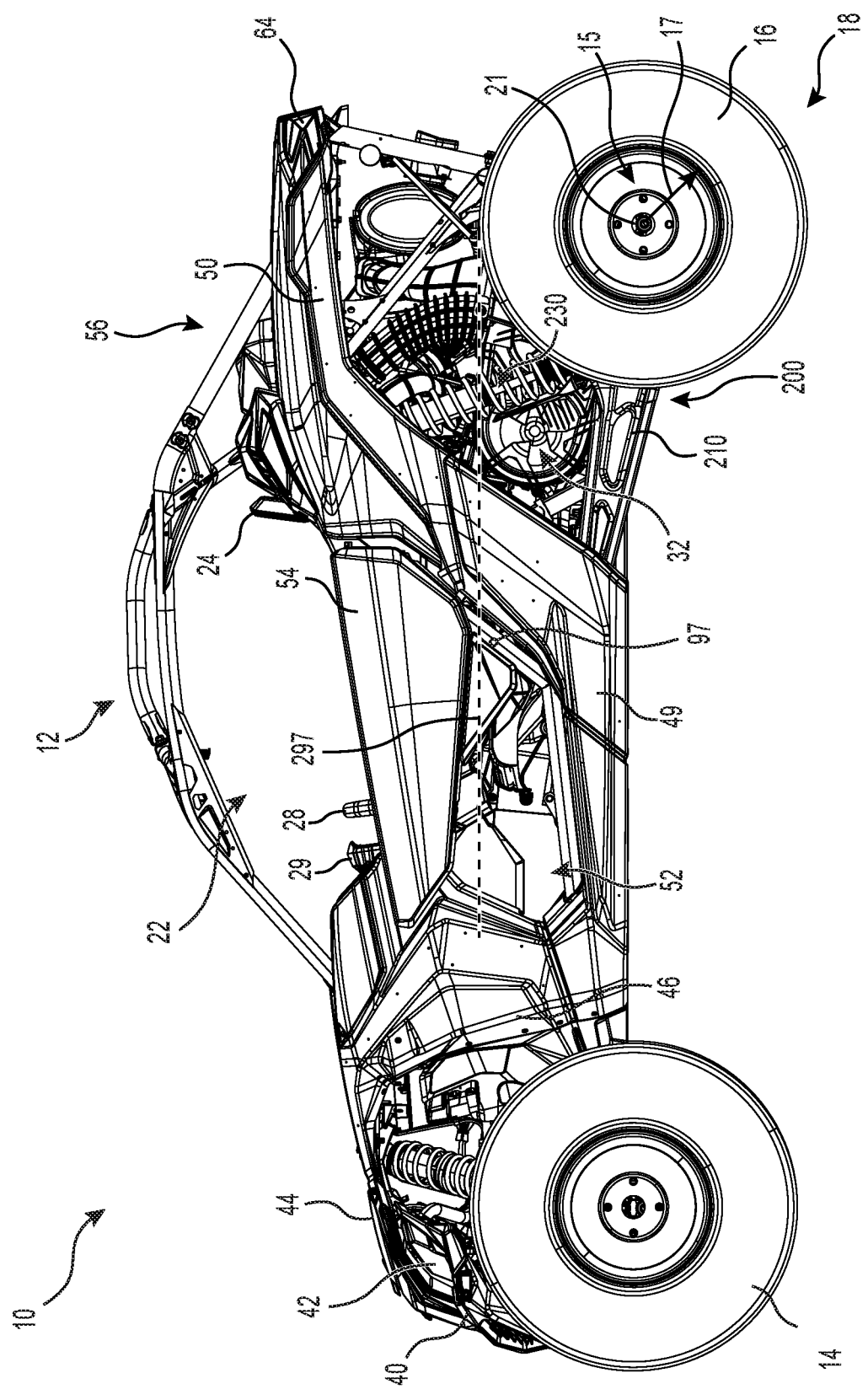
FIG. 2 is a left side elevation view of the vehicle of FIG. 1.
Figure 3:
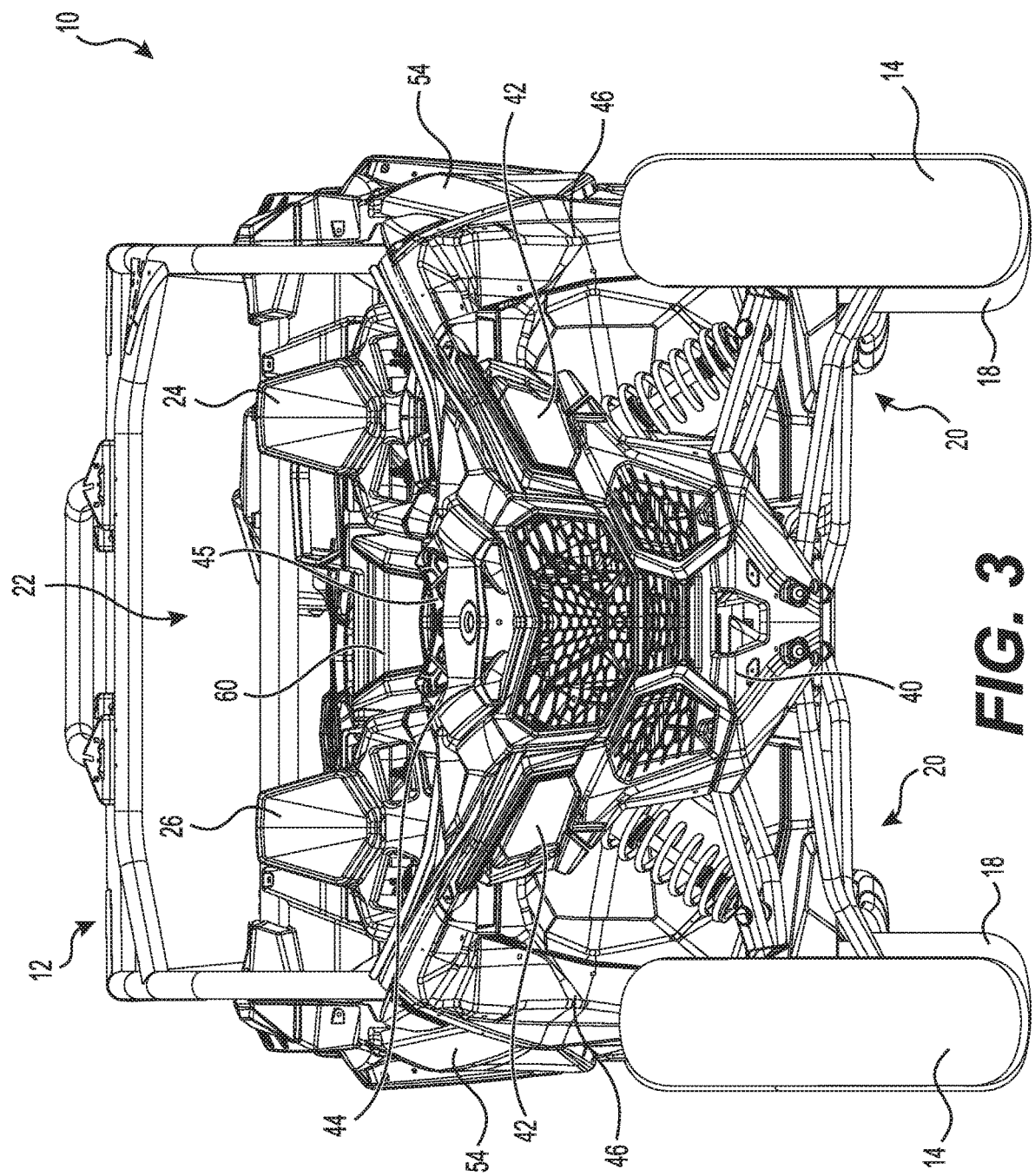
FIG. 3 is a front elevation view of the vehicle of FIG. 1.
Figure 7:
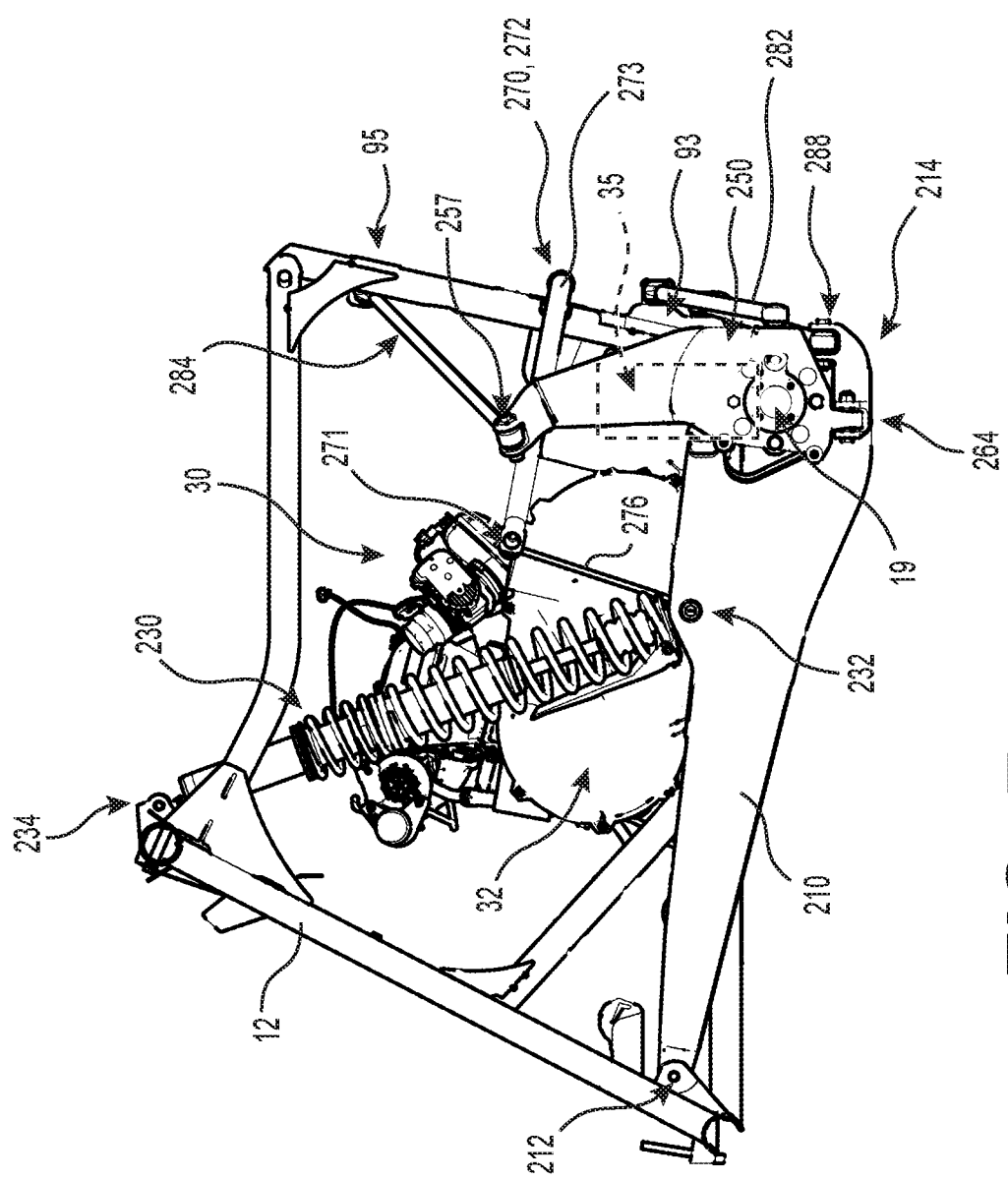
FIG. 7 is a left side elevation view of the rear vehicle portions of FIG. 5.

The general features of the off-road vehicle 10 will be described with respect to FIGS. 1 to 4. The vehicle 10 has a frame 12, two front wheels 14 connected to a front of the frame 12 by front suspension assemblies 20, and two rear wheels 18 connected to the frame 12 by rear suspension assemblies 200. The two rear wheels 18 (a rear right wheel 18 and a front rear wheel 18) are connected to a rear of the frame 12 by the rear suspension assemblies 200. The rear left wheel 18 includes a rear left rim 15 having an inner rim radius 17, and a rear left tire 16 mounted to the rear left rim 15. Similarly, the rear right wheel 18 includes a rear right rim 15 having the same inner rim radius 17, and a rear right tire 16 mounted to the rear right rim 15. While the rear rims 15 may be formed (for example with a tapered thickness) such that different radii could be defined, the inner rim radius 17 is defined herein as the largest possible radius (from a center point to the farthest edge). Each of the left and right rear wheels 18 is connected to a wheel hub 19 (see FIGS. 5 and 7) that is rotationally connected to a knuckle 250 (described below) such that the wheel 18 can rotate about a corresponding left and right wheel axis 21 (FIG. 2). Operation and control of the rear wheels 18 and the rear suspension assemblies 200 will be described in more detail below.

The frame 12 defines a central cockpit area 22 inside which are disposed a driver seat 24 and a passenger seat 26. On a rear side of the frame 12, the frame 12 includes a lower rear portion 93 and a connection bracket 95 to which portions of the rear suspension assemblies 200 are connected, as will be described in more detail below.

Figure 14:
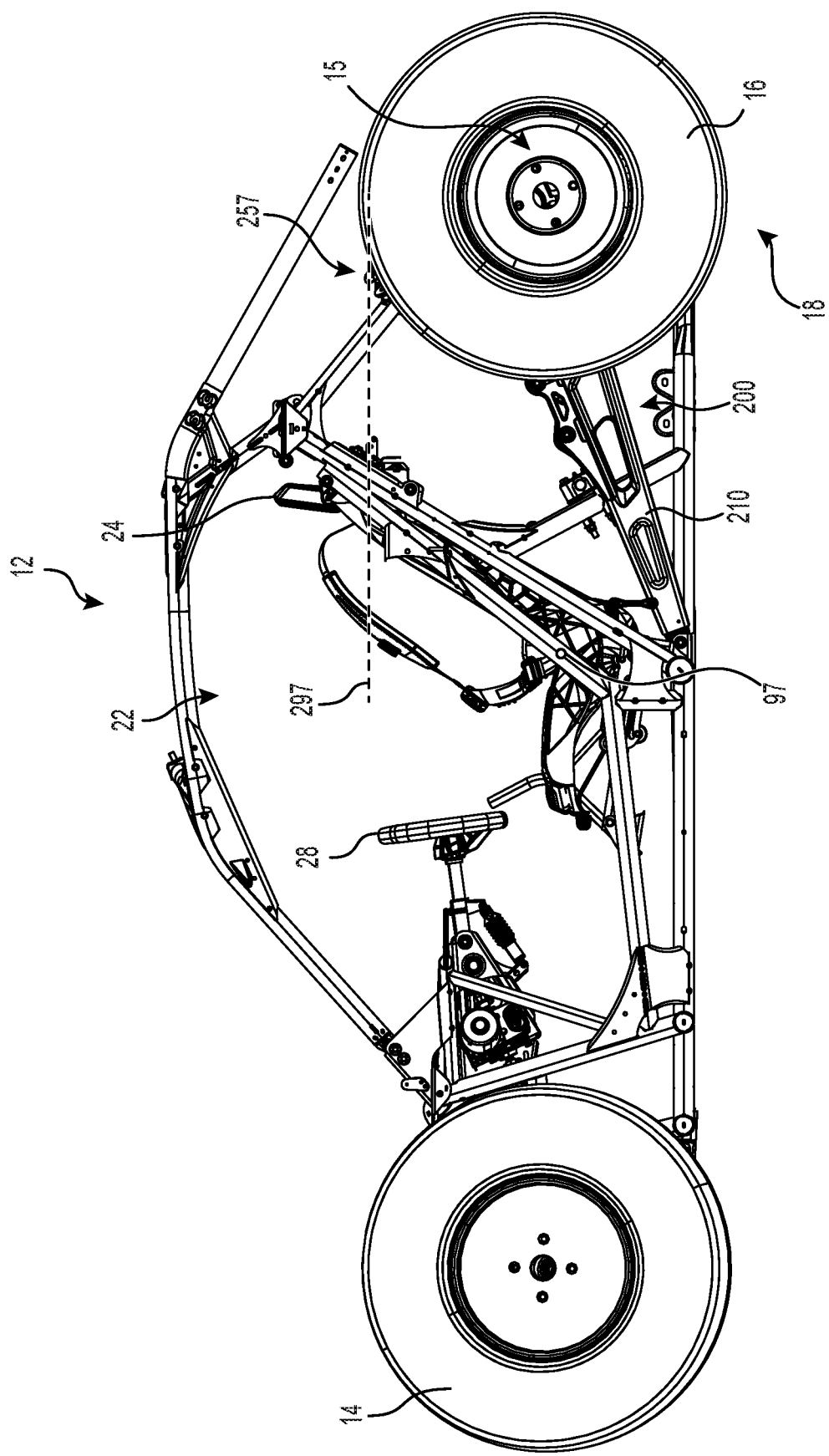
FIG. 14 is a left side elevation view of portions of the vehicle of FIG. 1, with body panels and powerpack components removed, with the suspension assemblies in a full bump position.

In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. The driver seat 24 has a seat index point (SIP) 97, also referred to as an H-point 97, an approximate position of which is illustrated in FIG. 2, as well as FIG. 14. The SIP 97 is determined using a seat index point device, as directed by the Surface Vehicle Standard SAE J1163 MAY2012 (doi.org/10,4271/1163_201205), the entirety of which is incorporated herein by reference. In different embodiments, it is contemplated that the exact position of the SIP 97 could vary.

A steering wheel 28 is disposed in front of the driver seat 24. The steering wheel 28 is used to turn the front wheels 14 to steer the vehicle 10. Various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

Figure 5:
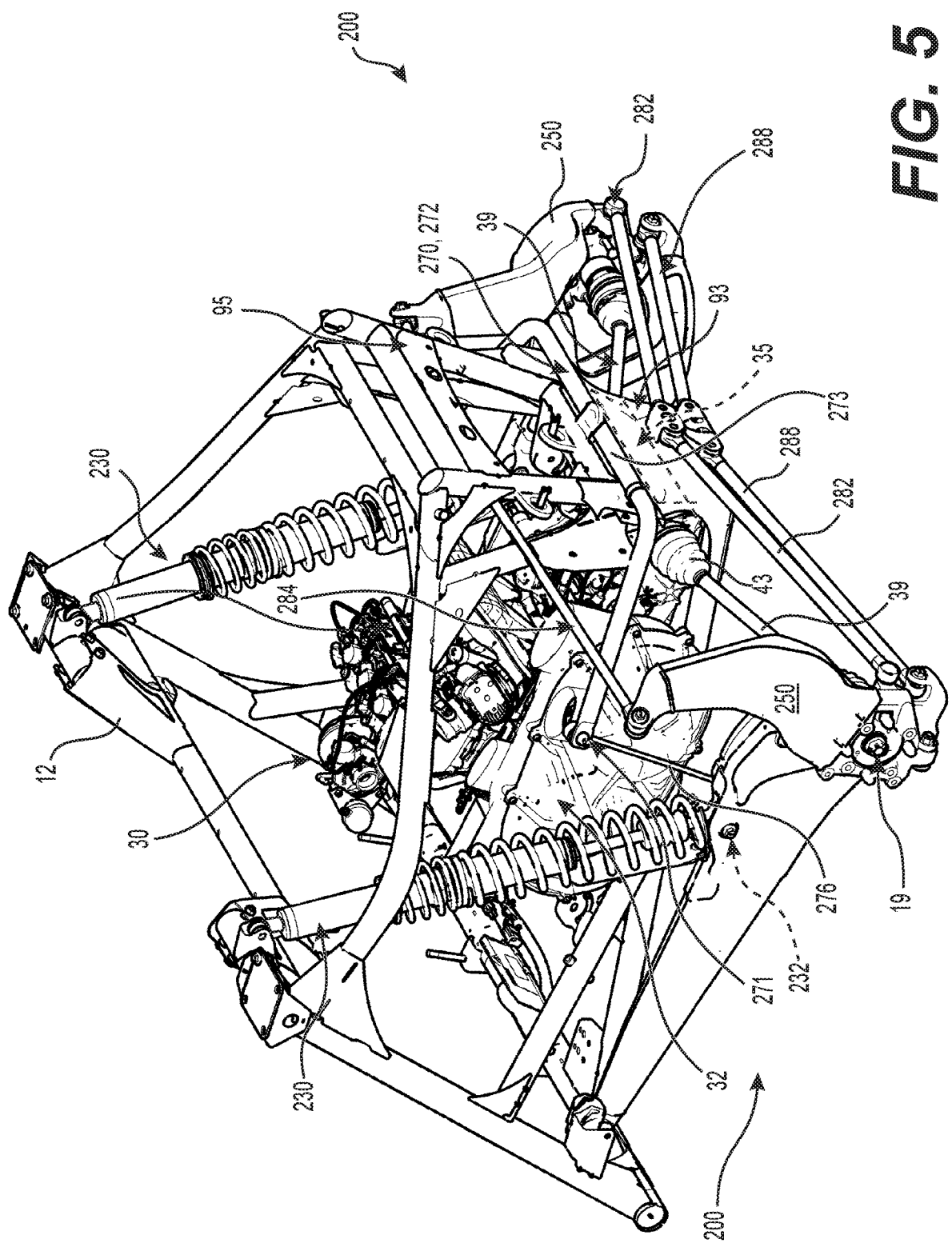
FIG. 5 is a rear, left side perspective view of portions of a rear of the vehicle of FIG. 1.
Figure 6:
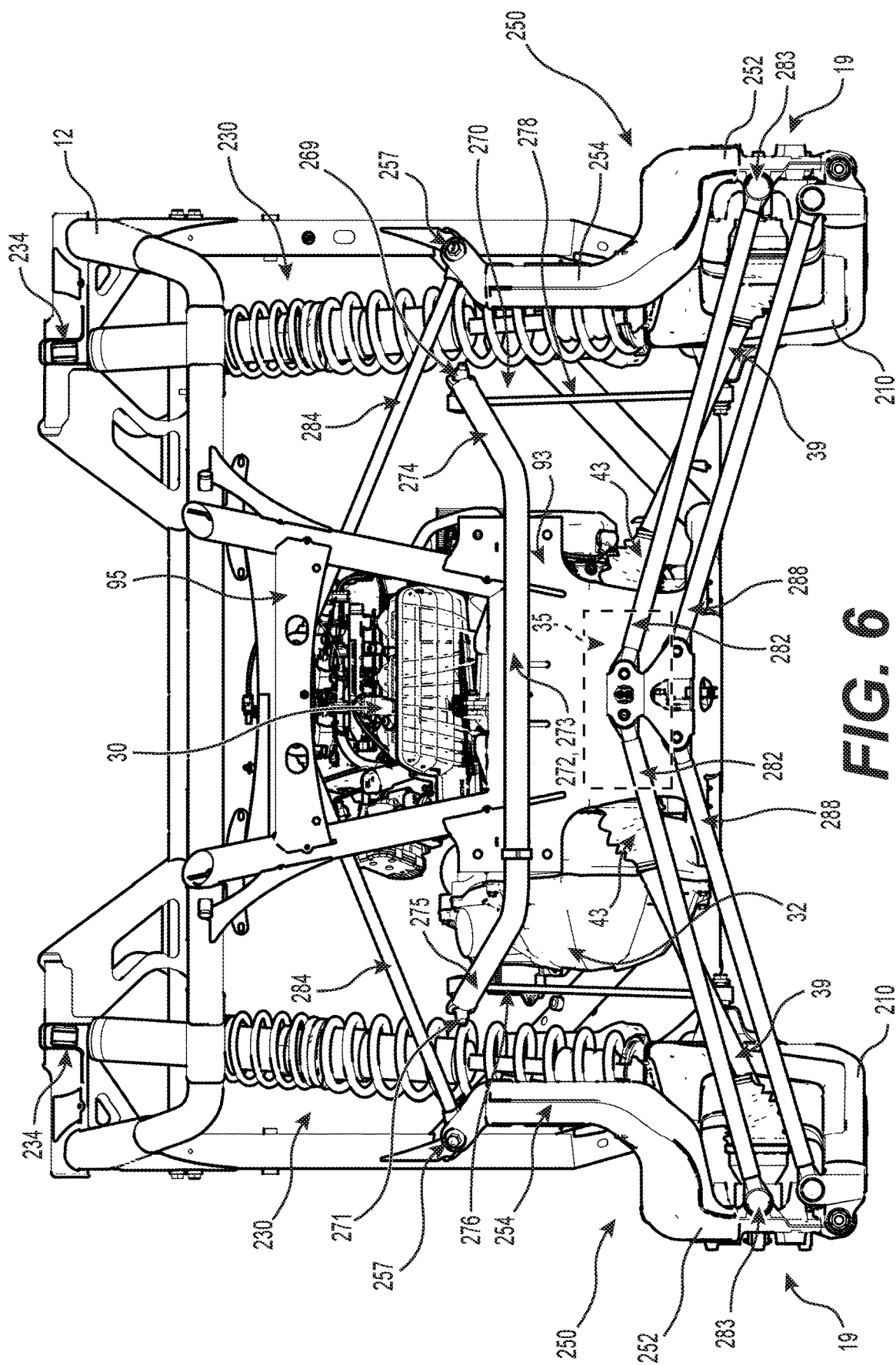
FIG. 6 is a rear elevation view of the rear vehicle portions of FIG. 5.
Figure 8:
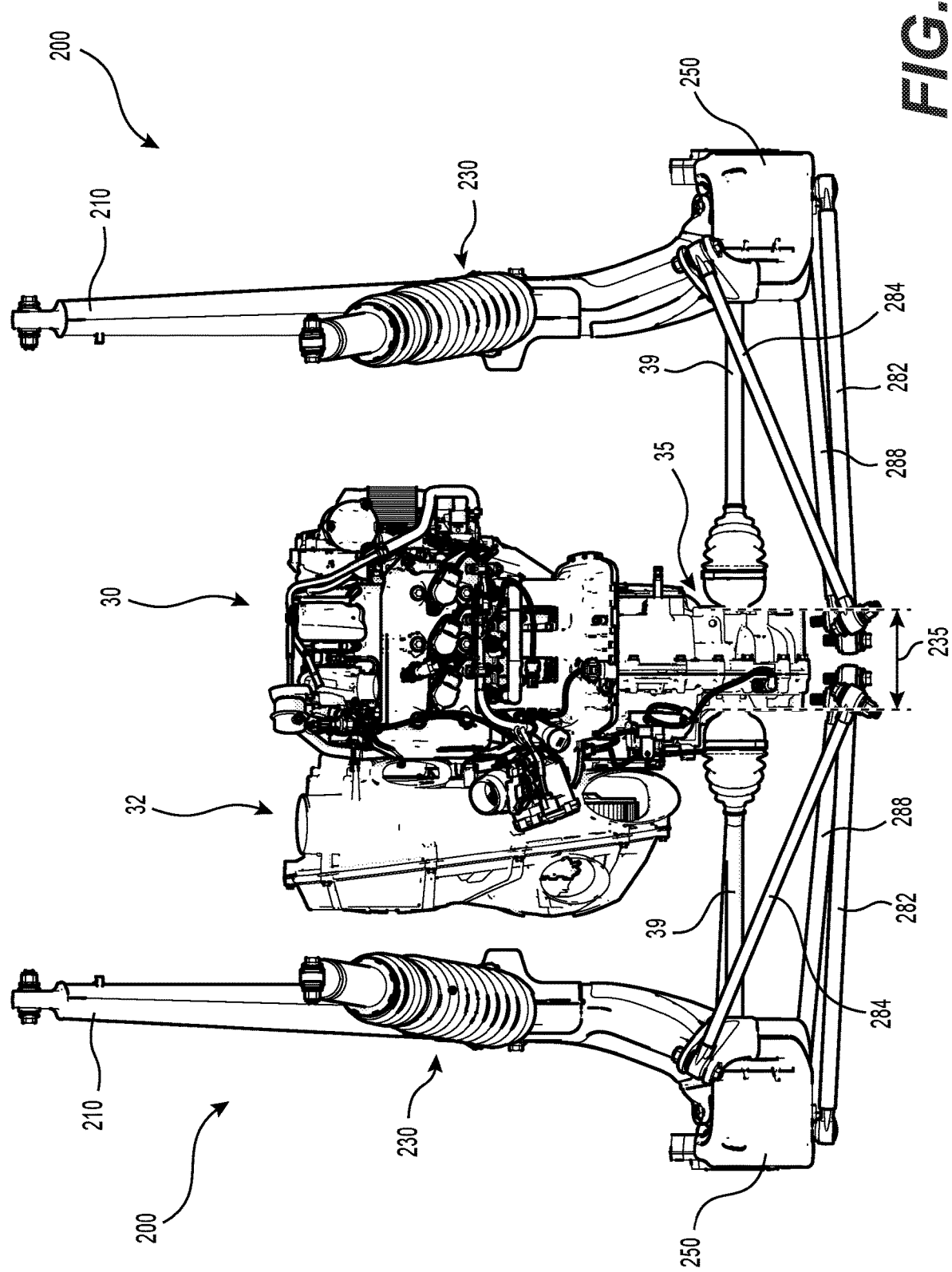
FIG. 8 is a top plan view of rear portions of the vehicle of FIG. 1, including an engine, rear suspensions, and rear drive gear.

As can be seen in FIGS. 5, 6, and 8, the vehicle 10 includes a motor 30, specifically an internal combustion engine 30, disposed in a rear portion of the vehicle 10 and connected to the frame 12. The engine 30 is connected to a continuously variable transmission (CVT) 32 disposed on a left side of the engine 30. The CVT 32 is operatively connected to a transaxle 33 to transmit torque from the engine 30 to the transaxle 33. The transaxle 33 is operatively connected to the front and rear wheels 14, 18 to propel the vehicle 10. For the rear wheels 18, the transaxle 33 includes a rear gear train 35 (see FIG. 8, also shown schematically in FIGS. 5 and 6). Depending on the implementation, the rear gear train 35 could include a spool gear, differential, or other known final gear train assembly. The vehicle 10 includes two shafts 39, also referred to as half-shafts 39, which connect the rear gear train 35 to the rear wheels 18. A left shaft 39 has a laterally outward end connected to the rear left wheel 18 and a laterally inward end connected to the rear gear train 35. A right shaft 39 has a laterally outward end connected to the rear right wheel 18 and a laterally inward end connected to the rear gear train 35. The driven output gears of the rear differential 35 are thus operatively connected to and drive the left and right shafts 39 via constant velocity (CV) joints (not shown), also known as homokinetic joints, located inside flexible covers 43. It is contemplated that other types of rear gear trains could be implemented.

Turning back to FIGS. 1 to 4, body panels of the vehicle 10 will be described. The body panels are connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 20 and laterally between the front wheels 14. The front panels 40 define two apertures inside which the headlights 42 of the vehicle 10 are disposed. A cover 44 extends generally horizontally reward from a top of the front panels 40. Front fenders 46 are disposed rearward of the front panels 40 on each side of the vehicle 10. Each front fender 46 is disposed in part above and in part behind of its corresponding front wheel 14. Lower panels 48 extend along the bottom of the frame 12 between the front and rear wheels 14, 18. As can be seen in FIG. 2 for the left lower panel 48, each lower panel 48 has a front end disposed under the bottom portion of its corresponding front fender 46 and extends rearward therefrom. A generally L-shaped panel 49 is disposed behind the rear end of each lower panel 48. Generally L-shaped rear fenders 50 extend upward and then rearward from the rear, upper ends of the L-shaped panels 49. Each rear fender 50 is disposed in part above and in part forward of its corresponding rear wheel 18. The rear fenders 50 define apertures at the rear thereof to receive the brake lights 64 of the vehicle 10. It is contemplated that the brake lights 64 could be replaced with reflectors or that reflectors could be provided in addition to the brake lights 64.

On each side of the vehicle 10, the front fender 46, the lower panel 48, the L-shaped panel 49 and the rear fender 50 define a passage 52 through which a driver (or passenger depending on the side of the vehicle 10) can enter or exit the vehicle 10. Each side of the vehicle 10 is provided with a door 54 that selectively closes an upper portion of the corresponding passage 52. Each door 54 is hinged at a rear thereof to its corresponding rear fender 50 and associated portion of the frame 12 and is selectively connected at a front thereof to its corresponding front fender 46 via a releasable latch (not shown). It is contemplated that each door 54 could be hinged at a front thereof and latched at a rear thereof. As best seen in FIG. 2 for the left side of the vehicle 10, when the doors 52 are closed the lower portions of the passages 52 are still opened. It is contemplated that nets could extend in the lower portions of the passages 52 when the doors 54 are closed or that the doors 54 could be larger so as to close the lower portions of the passages 52.

Figure 4:
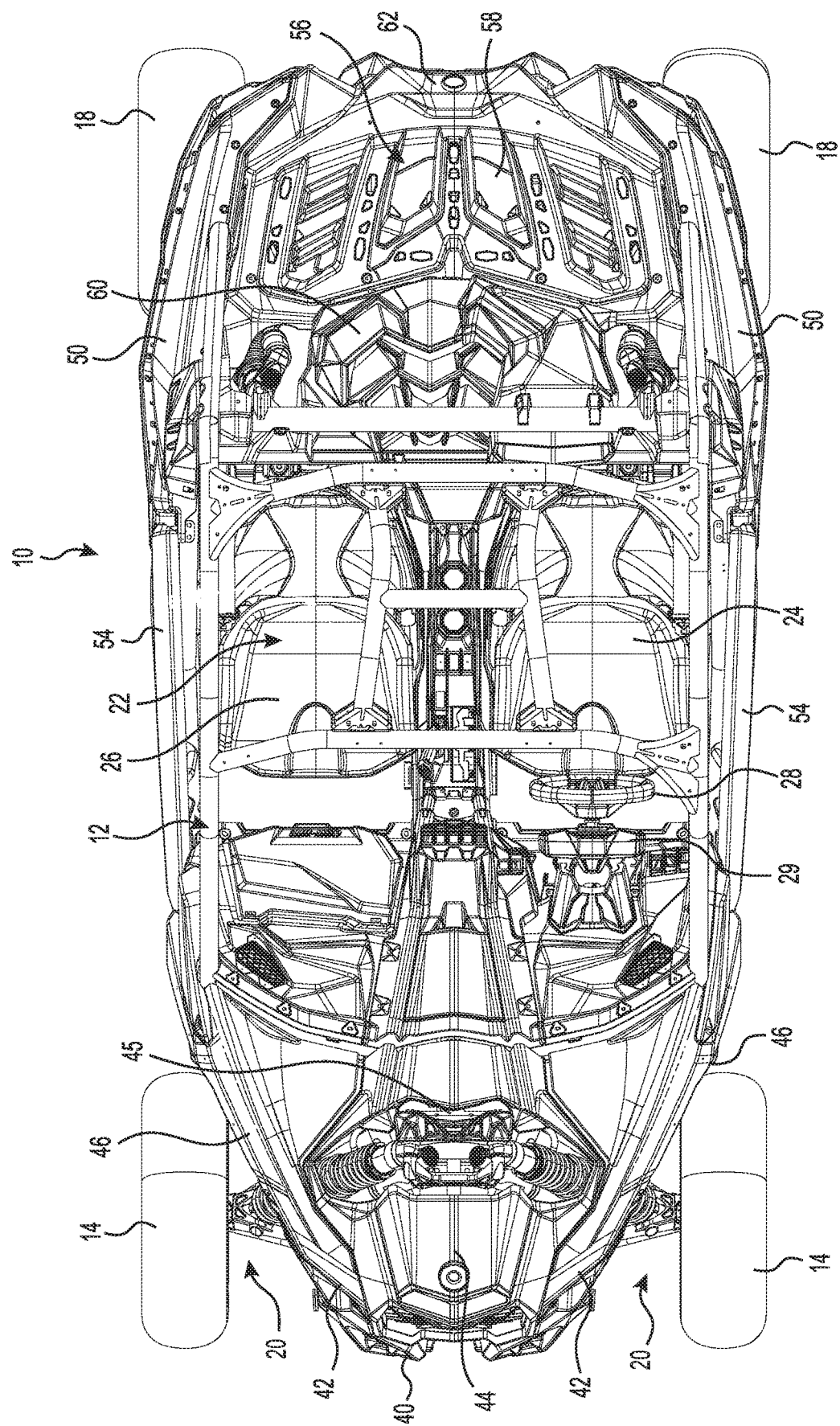
FIG. 4 is a top plan view of the vehicle of FIG. 1.

As best seen in FIG. 4, the rear fenders 50 define a cargo space 56 therebetween behind the seats 24, 26. The cargo space 56 has a floor 58 extending horizontally between the rear fenders 50. The floor 58 has a plurality of apertures such that the floor 58 can act as an attachments base to receive anchors such as those described in U.S. Pat. No. 8,875,830, issued Nov. 4, 2014, the entirety of which is incorporated herein by reference, in order to secure various items in the cargo space 56. It is contemplated that hooks or loops could be provided instead of or in addition to the apertures in the floor 58. It is also contemplated that the floor 58 could not be provided with any attachment features. It is contemplated that the floor 58 could be replaced by a cargo box that can be tilted in order to dump its content. As best seen in FIG. 4, rear panels 62 are disposed laterally between the rear wheels 18 behind the floor 58.

With reference to FIGS. 5 to 10, the vehicle 10 further includes a sway bar assembly 270 disposed in a rear portion of the vehicle 10. The sway bar assembly 270 includes a sway bar 272, having a generally truncated V-shape. The sway bar 272 includes a central portion 273 arranged generally horizontally left to right and defining a sway bar axis, a right portion 274 extending generally forward and rightward from a right end of the central portion 273, and a left portion 275 extending generally forward and leftward from a left end of the central portion 273. The central portion 273 is pivotally connected to the lower rear portion 93 of the frame 12.

The sway bar assembly 270 further includes a left link 276 and a right link 278. The left link 276 has a bottom end pivotally connected to a swing arm 210 of the left suspension assembly 200 and a top end pivotally connected to a left end of the sway bar 272 at a ball joint 271. The right link 178 has a bottom end pivotally connected to a swing arm 210 of the right suspension assembly 200 and a top end pivotally connected to a right end of the sway bar 272 at a ball joint 269. According to the present implementation, the sway bar 172 is disposed rearward of the shock absorber assemblies 230. It is contemplated that the sway bar assembly 170 could be differently shaped or arranged, depending on the particular implementation. As can be seen schematically in FIG. 7 for the sway bar link 276, the sway bar links 276, 278 are disposed at least partially forward of the rear gear train 35. Specifically, the sway bar links 276, 278 are disposed forward of the CV joints connecting the shafts 39 to the rear gear train 35. The swing arms 210 and shock absorber assemblies 230 of the rear suspension assemblies 200 are described in more detail below.

The rear suspension assemblies 200 will now be described in more detail with reference to FIGS. 5 to 13. As the left and right rear suspension assemblies 200 are mirror images of each other, only the left rear suspension assembly 200 will be described in detail. Components of the rear right suspension assembly 200 that correspond to those of the rear left suspension assembly 200 have been labeled with the same reference numerals in the figures.

The rear suspension assembly 200 includes the swing arm 210, the shock absorber assembly 230, and the knuckle 250 connecting the rear wheel 18 to the swing arm 210, as well as three links 282, 284, 288 connecting the swing arm 210 and the knuckle 250 to the rear portion 93, 95 of the frame 12.

The swing arm 210 pivotally connects to the frame 12 at a front end 212. The rear wheel 18 is connected to a rear portion 214 of the swing arm 210, as will be described in more detail below. The rear portion 214 includes two rearwardly extending arms: a top arm 215 extending above the wheel hub 19 and a bottom arm 217 extending below the wheel hub 19. The shaft 39 driving the wheel 18 via the wheel hub 19 passes vertically between the arms 215, 217. Each of the top arm 215 and the bottom arm 217 connects to the knuckle 250, as will be described in more detail below. The swing arm 210 pivots about a pivot axis 213 at the front end 212, allowing the rear wheel 18 and the rear portion 214 of the swing arm 210 to move generally up and down relative to the frame 12.

The shock absorber assembly 230 is pivotally connected to the swing arm 210 at a bottom end 232 of the shock absorber assembly 230. The bottom end 232 includes a ball joint 233 for pivoting relative to the swing arm 210. The bottom end 232 of the shock absorber assembly 230 is connected to the swing arm 210 slightly rearward of and vertically higher than the connection of the bottom end of the left sway bar link 276 to the swing arm 210. From the ball joint 232, the shock absorber assembly 230 extends upward, forward and slightly laterally inward. A top end 234 of the shock absorber assembly 230 is pivotally connected to an upper portion of the frame 12. The top end 234 includes a ball joint, but it is contemplated that different means could be implemented to pivotally connect the shock absorber assembly 230 to the frame 12. The shock absorber assembly 230 includes a coil spring disposed around a hydraulic shock. Since shock absorber assemblies of this type are well known, the shock absorber assembly 230 will not be described in greater detail.

The rear suspension assembly 200 includes the knuckle 250 for connecting together the swing arm 210 and the rear wheel 18. Shown in isolation in FIGS. 11 and 12, the knuckle 250 includes a lower portion 252 connected to and disposed generally around the wheel hub 19 (see FIG. 7). The lower portion 252 defines an aperture 253 therein which receives the wheel hub 19. The aperture 253 has an aperture axis 251 at its center, which is aligned with the wheel axis 21.

The knuckle 250 also includes an upper portion 254 connected to and extending generally upward from the lower portion 252. Specifically, the upper portion 254 of the knuckle 250 extends first upward, then inward, and subsequently upward from the lower portion 252 of the knuckle 250. At a top end of the upper portion 254, the knuckle 250 forms a bracket 257 which extends slightly outward from the top of the upper portion 254. The bracket 257 receives one end of the link 284, as will be described in more detail below. As is highlighted by a line 297 illustrated in FIGS. 2 and 14, the upper portion 254 is vertically higher than the SIP 97 in at least an at rest position of the suspension assemblies 20, 200 (FIG. 2), also referred to as a stationary or showroom position, and a fully compressed position of the suspension assemblies 20, 200 (FIG. 14), also referred to as a full bump position.

The lower and upper portions 252, 254 of the knuckle are integrally formed in the present implementation. It is contemplated that the lower and upper portions 252, 254 could be separately formed and subsequently connected together (by welding for instance) in some implementations.

The knuckle 250 is pivotally connected to the rear portion 214 of the swing arm 210 at two points, specifically by two ball joints 262, 264. An upper part of the lower portion 252 includes the ball joint 262, received in a bracket 263, disposed vertically higher than the aperture 253 and above the wheel axis 21. The ball joint 262 connects the knuckle 250 to the top arm 215 of the rear portion 214 of the swing arm 210. A lower part of the lower portion 252 of the knuckle 250 includes the ball joint 264, received in a bracket 265, disposed vertically lower than the aperture 253 and below the wheel axis 21. The ball joint 264 connects the knuckle 250 to the bottom arm 217 of the rear portion 214 of the swing arm 210. The ball joint 264 connects to a bottom part of the rear portion 214 of the swing arm 210 (see FIG. 7).

The rear suspension 200 further includes the link 282 connected between the knuckle 250 and the frame 12. The link 282 has a laterally outward end pivotally connected to the lower portion 252 of the knuckle 250. Specifically, the lower portion 252 includes a bracket 255 to which the laterally outward end of the link 282 is connected via a ball joint 283 (see also FIG. 6). The bracket 255 and the laterally outward ball joint 283 of the link 282 is spaced from the center of the wheel (represented by the wheel axis 21) by a distance 299 (see FIG. 10). In the illustrated embodiment, the distance 299 is lengthened as much as possible in order to aid in reducing forces on the link 282 and the corresponding ball joints. The distance 299 is less, however, than the rim radius 17, in order to keep the outward end ball joint 283 of the link 282 within the wheel 15. The exact distance 299, and its ratio to the rim radius 17, could vary from the illustrated example. A laterally inward end of the link 282 is pivotally connected to the lower rear portion 93 of the frame 12.

The rear suspension 200 also includes the link 284 connected between the knuckle 250 and the frame 12. The link 284 has a laterally outward end pivotally connected to the upper portion 254 of the knuckle 250, specifically to the bracket 257 at the top end of the upper portion 254. A laterally inward end of the link 284 is pivotally connected to the frame 12, specifically to the connection bracket 95. As is illustrated, the connection bracket 95 is disposed vertically higher than the rear gear train 35 and the sway bar 272, such that the laterally inward end of the link 284, connected to the connection bracket 95, is disposed vertically higher than and spaced from the rear gear train 35 the sway bar 272, and the link 282. It is further noted that the upper portion 254 of the knuckle 250 is disposed rearward of the joints 269, 271 connecting the members 276, 278 to the sway bar 270. The upper portion 254 is disposed forward of the central portion 273, and the sway axis defined thereby. See, for example, FIG. 7.

Figure 24:
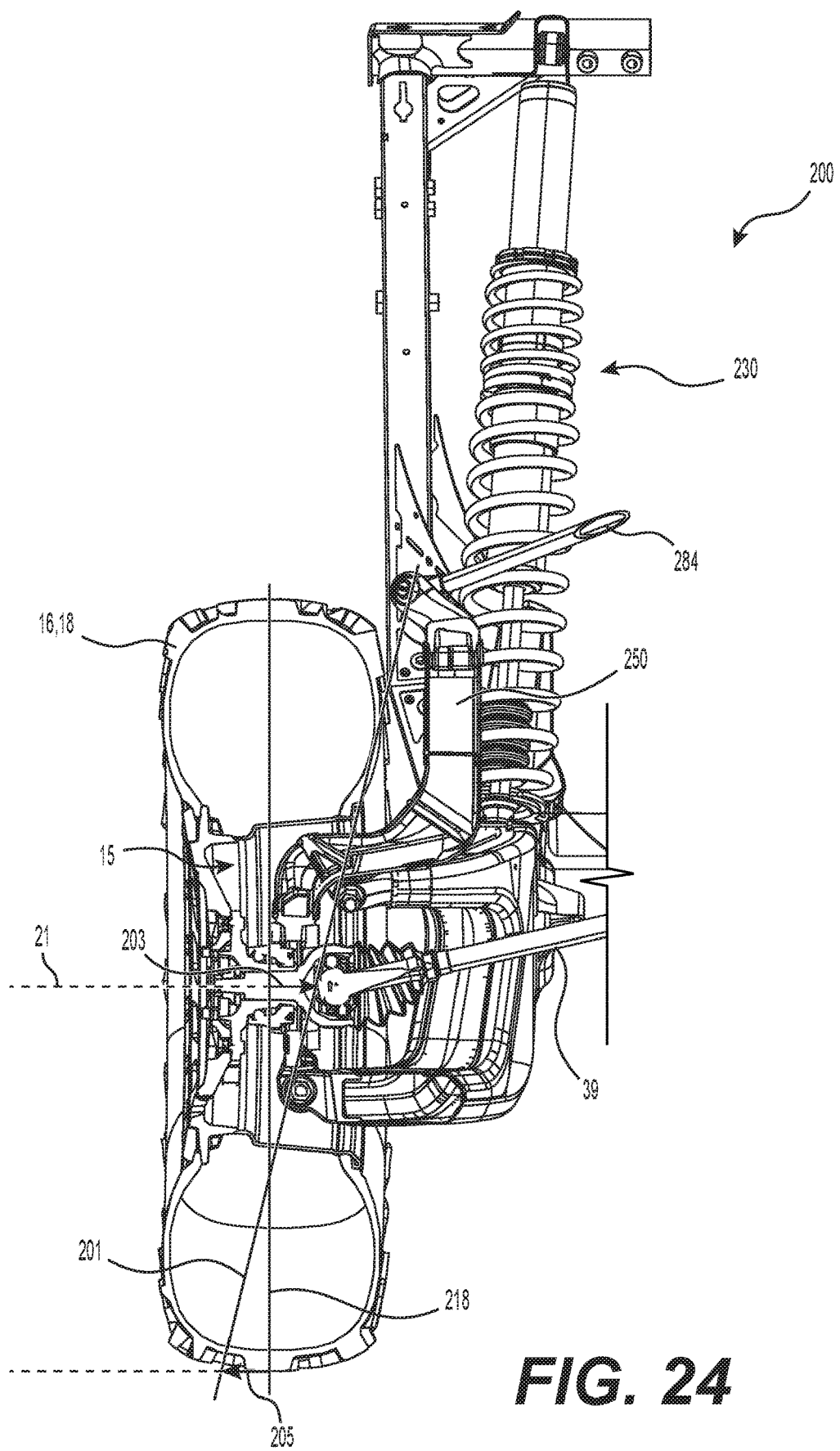
FIG. 24 is a partial, cross-sectional view of a portion of the frame, the left rear suspension assembly and the left wheel of the vehicle of FIG. 1.

With additional reference to FIG. 24, the knuckle 250 pivots about a kingpin axis 201 which is the steering axis of the rear wheel 18. The kingpin axis 201 is defined by a line 201 extending through the connection point of the link 284 to the knuckle 250 and the ball joint 264 connecting the knuckle 250 to the swing arm 110. The geometry of the rear suspension 200 has a positive spindle length 203. The spindle length 203 is a distance 203 from the kingpin axis 201 to a wheel center plane 218, as measured horizontally at the wheel axis 21. As the wheel center plane 218 is outward of the kingpin axis 201 at the height of the wheel axis 21, the spindle length 203 is a positive spindle length 203.

A scrub radius 205 is a lateral distance from the kingpin axis 201 to a center of a contact patch of the wheel 18, as represented by the plane 218, at a height at which both would theoretically touch the road. In the illustrated embodiment, the suspension assembly 200 creates a negative scrub radius 205, since the kingpin axis 201 is outward of the wheel center plane 218.

Figure 25:
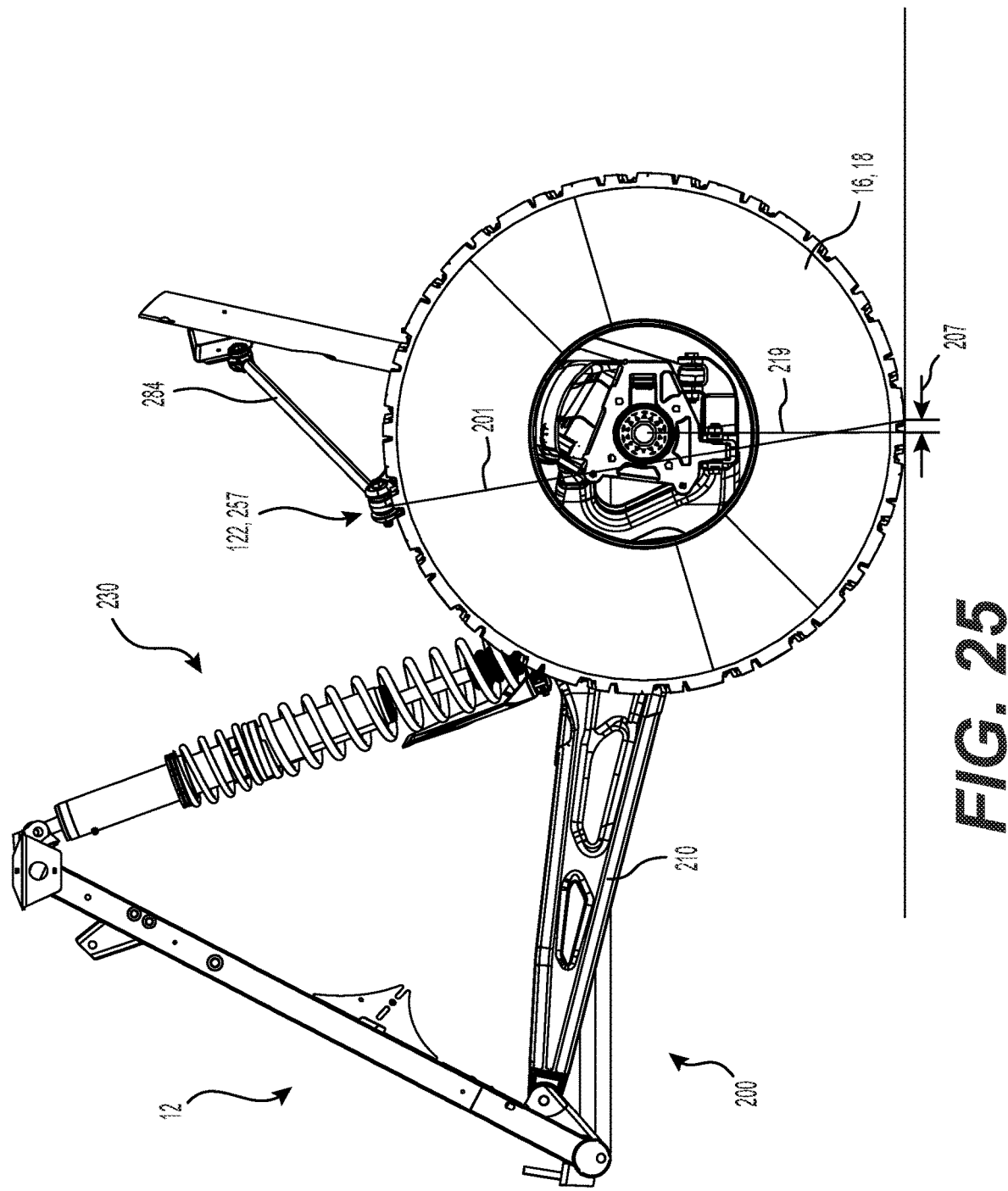
FIG. 25 is a left side elevation view of the frame portion, the left rear suspension assembly, and the left wheel of FIG. 24.

With reference to FIG. 25, a trail distance 207 or trail 207 is defined between the kingpin axis 201 and a vertical line 219 passing through the wheel center, measured longitudinally and at a height where both would theoretically touch the road. In the illustrated suspension system 200, the trail 207 is a negative trail since the kingpin axis 201 touches the road rearward of the wheel center, as illustrated by the line 219. The arrangement of each rear suspension assembly 200 to have positive spindle length, negative scrub radius, and negative trail aids in increasing stability of the vehicle 10 while travelling over rough or uneven terrain.

Figure 10:
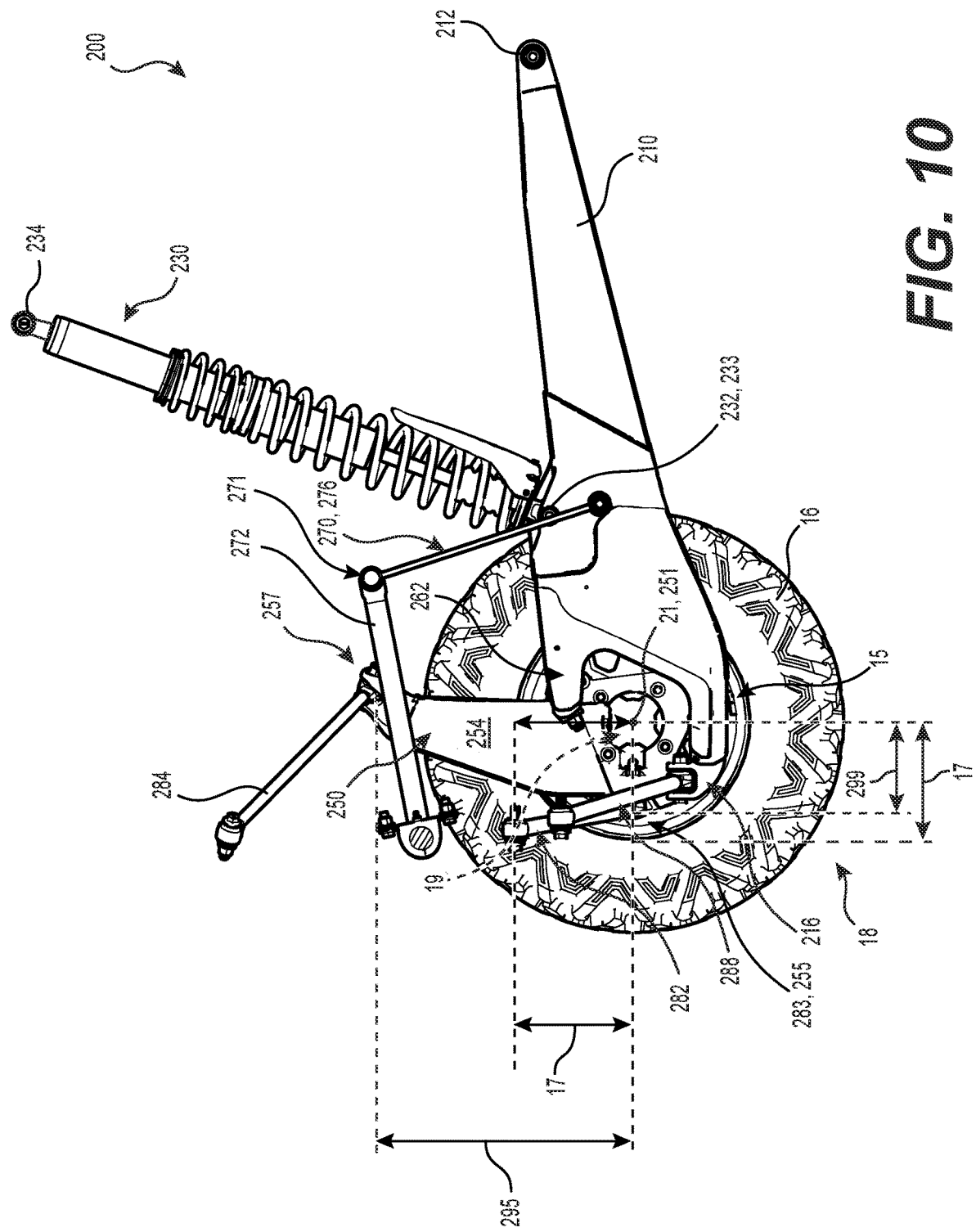
FIG. 10 is a cross-sectional, right side elevation view of the components illustrated in FIG. 9, taken along line 10-10 in FIG. 9.
Figure 11:
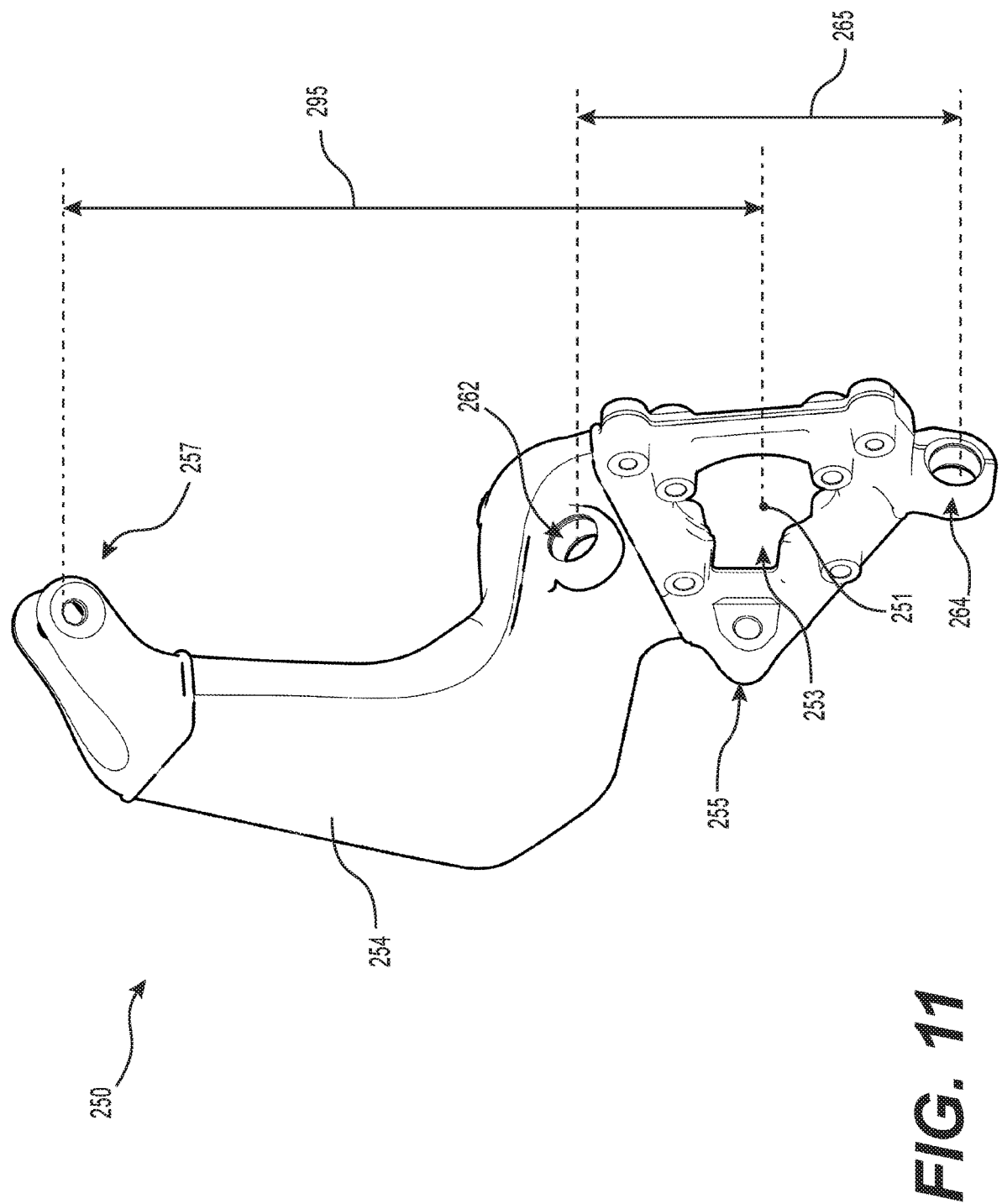
FIG. 11 is a front, right side perspective view of a left knuckle of the left rear suspension assembly of FIG. 9.
Figure 12:
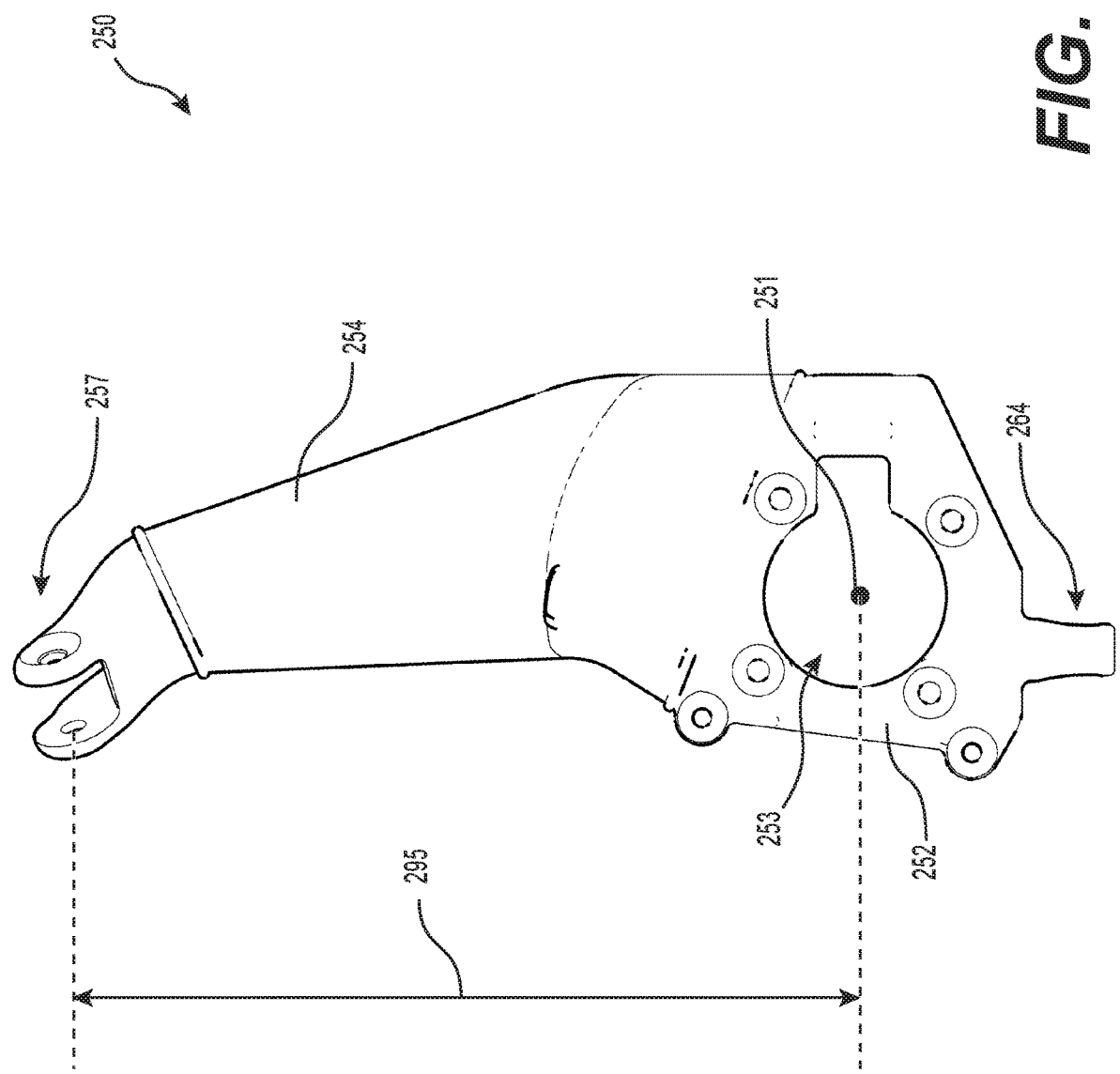
FIG. 12 is a left side elevation view of the left knuckle of FIG. 11.

Due to the form and arrangement of the knuckle 250 (including the upper portion 254 extending upward away from the wheel hub 19), the link 284 connects to the frame 12 at a different portion of the frame 12, spaced from the point at which the link 282 connects to the frame 12. As is illustrated in FIG. 10, the laterally outward end of the link 284 and the bracket 257 are distanced from the wheel axis 21 by a distance 295 that is greater than the inner rim radius 17. The knuckle 250 according to the present implementation is further configured such that the distance 295 between the aperture axis 251/wheel axis 21 and the laterally outward end of the link 284 is greater than half a distance 265 between the two ball joints 262, 264, as is illustrated in FIG. 11.

Figure 9:
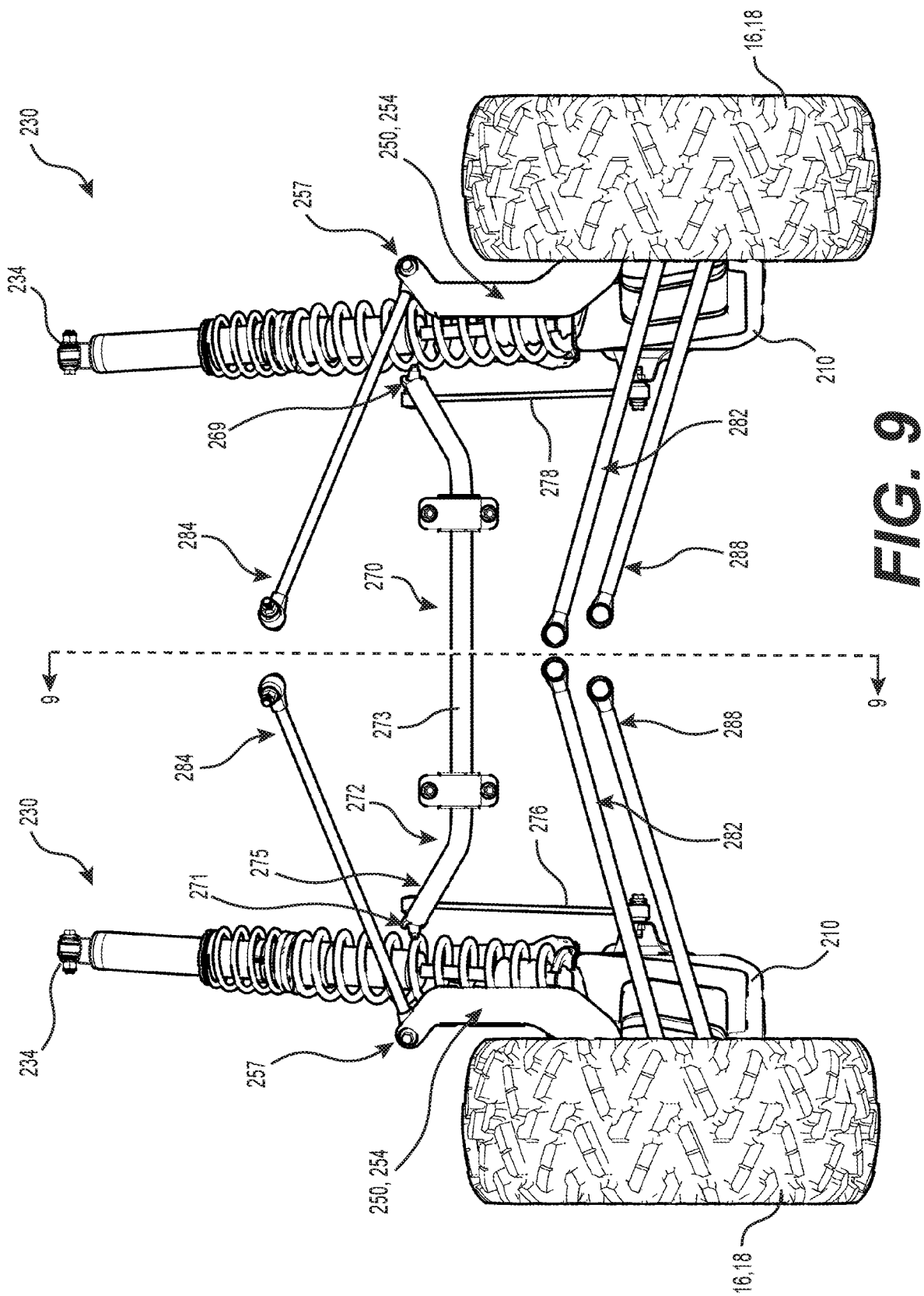
FIG. 9 is a rear elevation view of rear wheels, rear suspension assemblies, and a sway bar assembly of the vehicle of FIG. 1.
Figure 13:
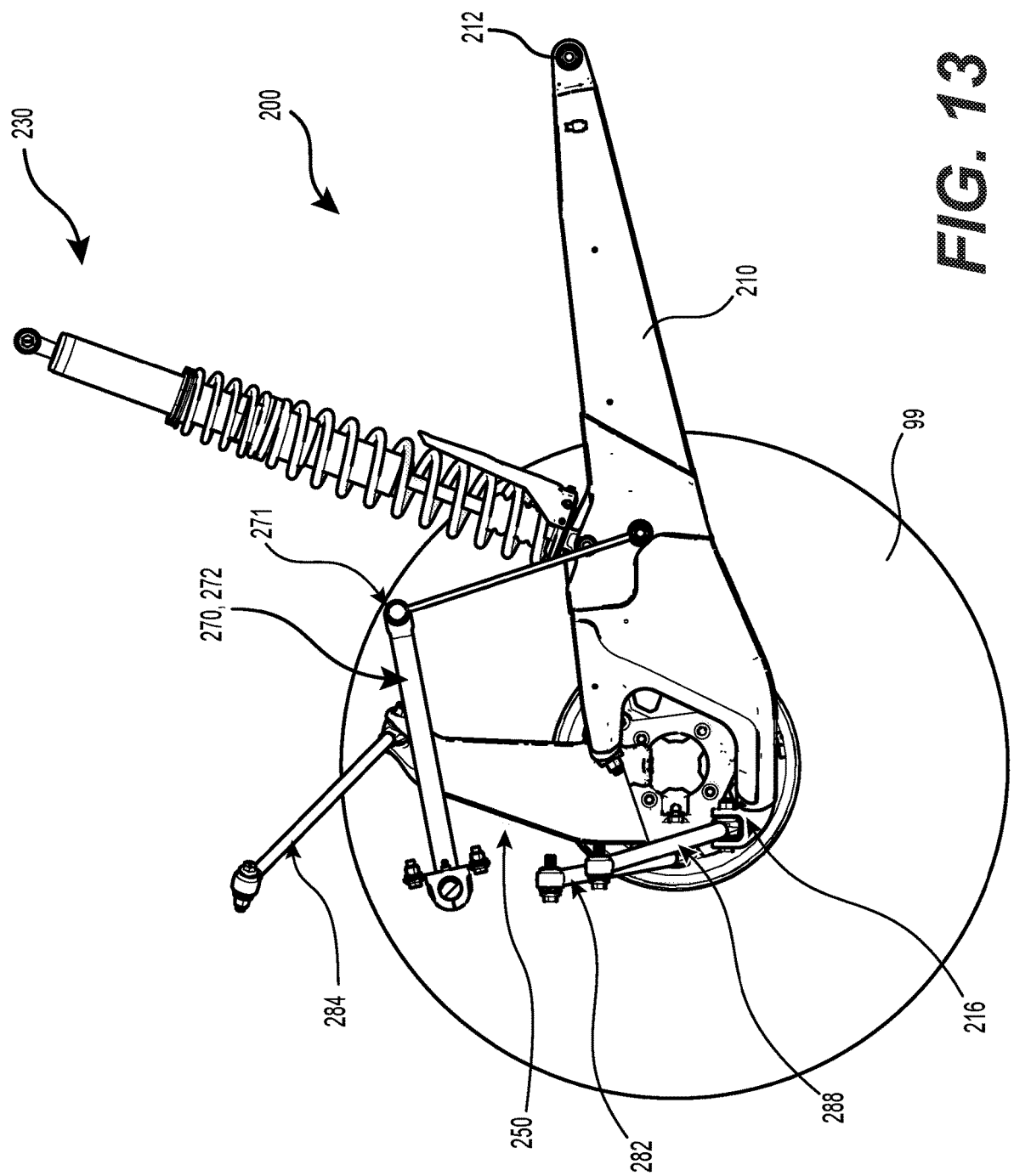
FIG. 13 is the cross-sectional, right side elevation view of FIG. 10, with another implementation of a rear wheel connected to the rear suspension.

As can be seen in at least FIG. 9, the top end of the upper portion 254 of the knuckle 250 and the laterally outward end of the link 284 are disposed vertically higher than a top surface of the rear wheel 18. Otherwise stated, the top end of the upper portion 254 of the knuckle 250 and the laterally outward end of the link 284 are disposed vertically higher than a vertically highest point of the rear wheel 18. In the illustrated implementation, the bracket 257 extends over at least a portion of a laterally interior portion of a top surface of the tire 16. In some non-limiting implementations, however, it is contemplated that the top end of the upper portion 254 may not be vertically higher than a rear wheel. For example, the rear suspension 200 with a different rear wheel 99 connected thereto is illustrated in FIG. 13. In this implementation of the rear wheel 99, the upper portion 254 of the knuckle 250 extends vertically along an interior side of the rear wheel 99 but does not extend above or over a top surface of the wheel 99.

The rear suspension assembly 200 further includes the link 288 between the swing arm 210 and the frame 12. A laterally outward end of the link 288 is pivotally connected to a rear portion of the swing arm 210, specifically to a bracket 216 defined in the rear portion of the swing arm 210. A laterally inward end of the link 288 is pivotally connected to the lower rear portion 93 of the frame 12, specifically to a point vertically lower than the laterally inward end of the link 282. The links 282, 284, 288 are arranged on a rear side of the frame 12, such that the links 282, 284, 288 are disposed at least partially rearward of the rear gear train 35. As can be seen in at least FIG. 7, the frame portions 93, 95 to which the laterally inward ends of the links 282, 284, 288 connect are disposed rearward of the rear gear train 35. As can be further seen in at least FIGS. 6, 8, and 9, a lateral distance separating the laterally inward ends of the links 282 is less than a lateral distance separating the laterally inward ends of the links 284 and the laterally inward ends of the links 288. It can further be seen that the distances separating the laterally inward ends of each pair of links 282, 284, 288 are each less than a width 235 of the rear gear train 35. As can be also be seen in the Figures, a lateral distance separating the laterally outward ends of the links 288 is less than a lateral distance separating the laterally outward ends of the links 282 and the laterally outward ends of the links 288.

Figure 15:
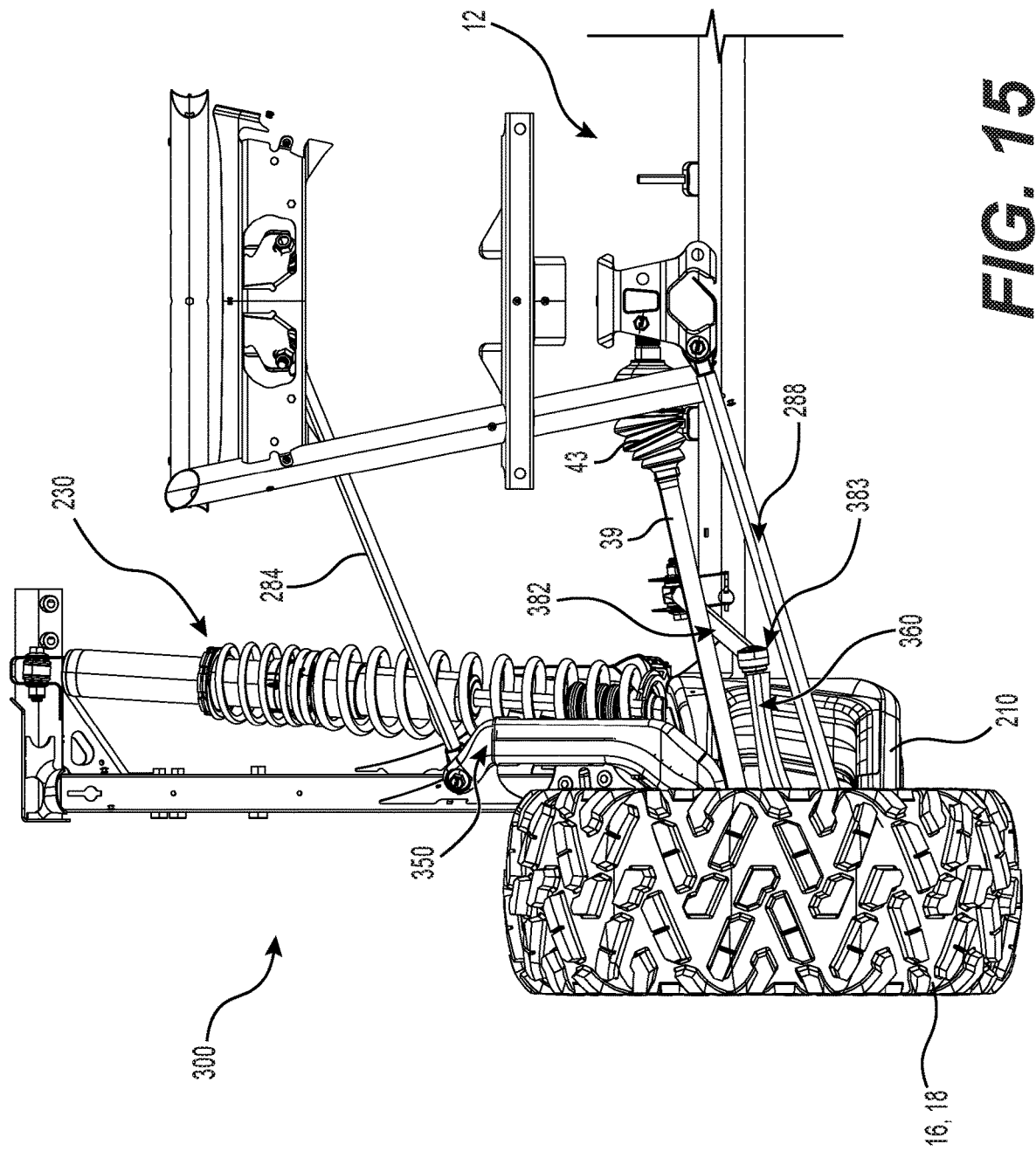
FIG. 15 is a rear elevation view of a left suspension assembly according to another non-limiting embodiment of the present technology.
Figure 16:
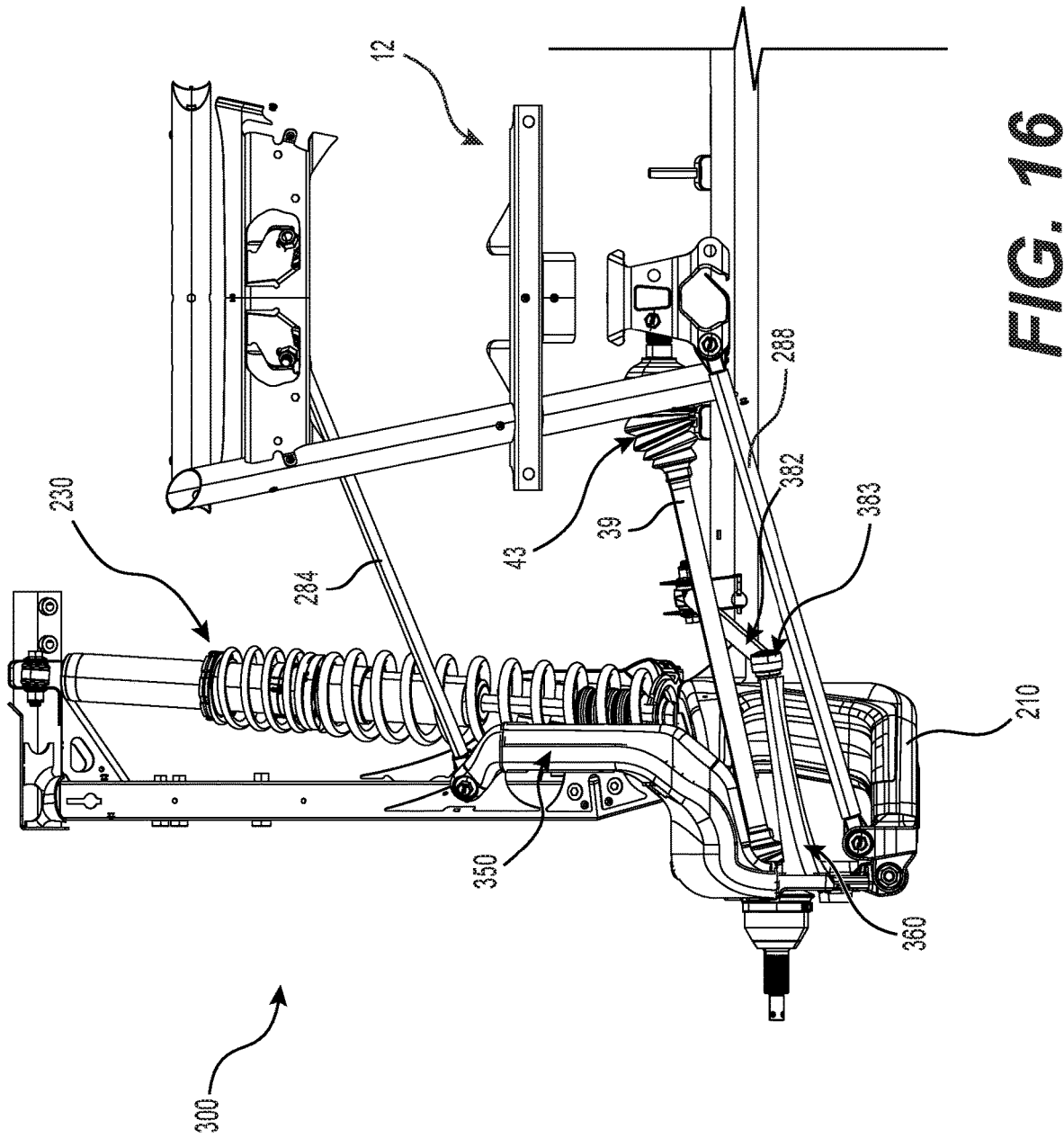
FIG. 16 is the rear elevation view of the left suspension assembly of FIG. 15, with a left wheel having been removed.
Figure 17:
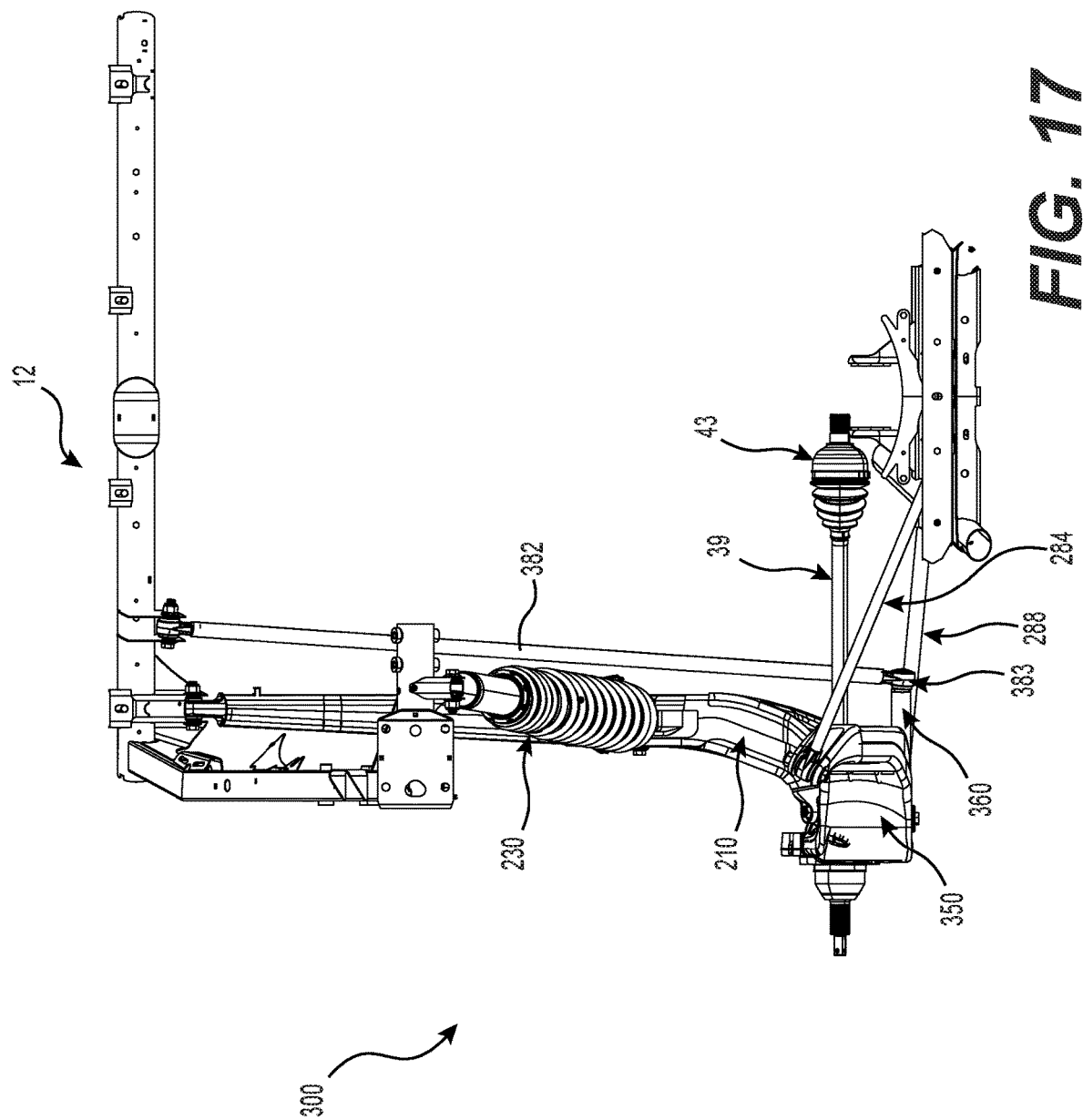
FIG. 17 is a top plan view of the left suspension assembly of FIG. 15, with the left wheel having been removed.

With reference to FIGS. 15 to 17, another non-limiting embodiment of a left rear suspension assembly 300 in accordance with the present technology is illustrated. A corresponding right rear suspension assembly 300 being a mirror image of the left assembly 300, only the left assembly 300 is shown and described herein. Elements of the assembly 300 that are similar to those of the assembly 200 retain the same reference numeral and will generally not be described again.

The suspension assembly 300 includes a knuckle 350 for connecting the rear wheel 18 to the swing arm 210. The knuckle 350 includes a protrusion 360 for connecting to a link 382 connected between the knuckle 350 and the frame 12 (the link 282 having been removed in this embodiment). The protrusion 360 is generally bar-shaped, extending inward from a main knuckle body, although it is contemplated that the particular shape of the protrusion 360 may vary. The protrusion 360 in the illustrated embodiment is integrally formed with remaining portions of the knuckle 350. In some embodiments, the protrusion 360 could be formed separately and then rigidly affixed to the remaining portions of the knuckle 350 (for example, by welding or fastening)

The link 382 extends generally longitudinally (front to rear) in the vehicle 10, in contrast to the link 288 which extends generally laterally (left-right). The link 382 extends between the knuckle 350 and the frame 12. The link 382 has a rearward end pivotally connected to the protrusion 360 of the knuckle 350, specifically via a ball joint 383. A forward end of the link 382 is pivotally connected to the lower portion of the frame 12, in the vicinity of the front end 212 of the swing arm 210. As can be seen from at least FIG. 17, the protrusion 360 and the ball joint 383 connecting the rear end of the link 382 are disposed rearward of the shaft 39. The link 382 passes under the shaft 39, as can be seen in FIGS. 15 and 16.

Figure 18:
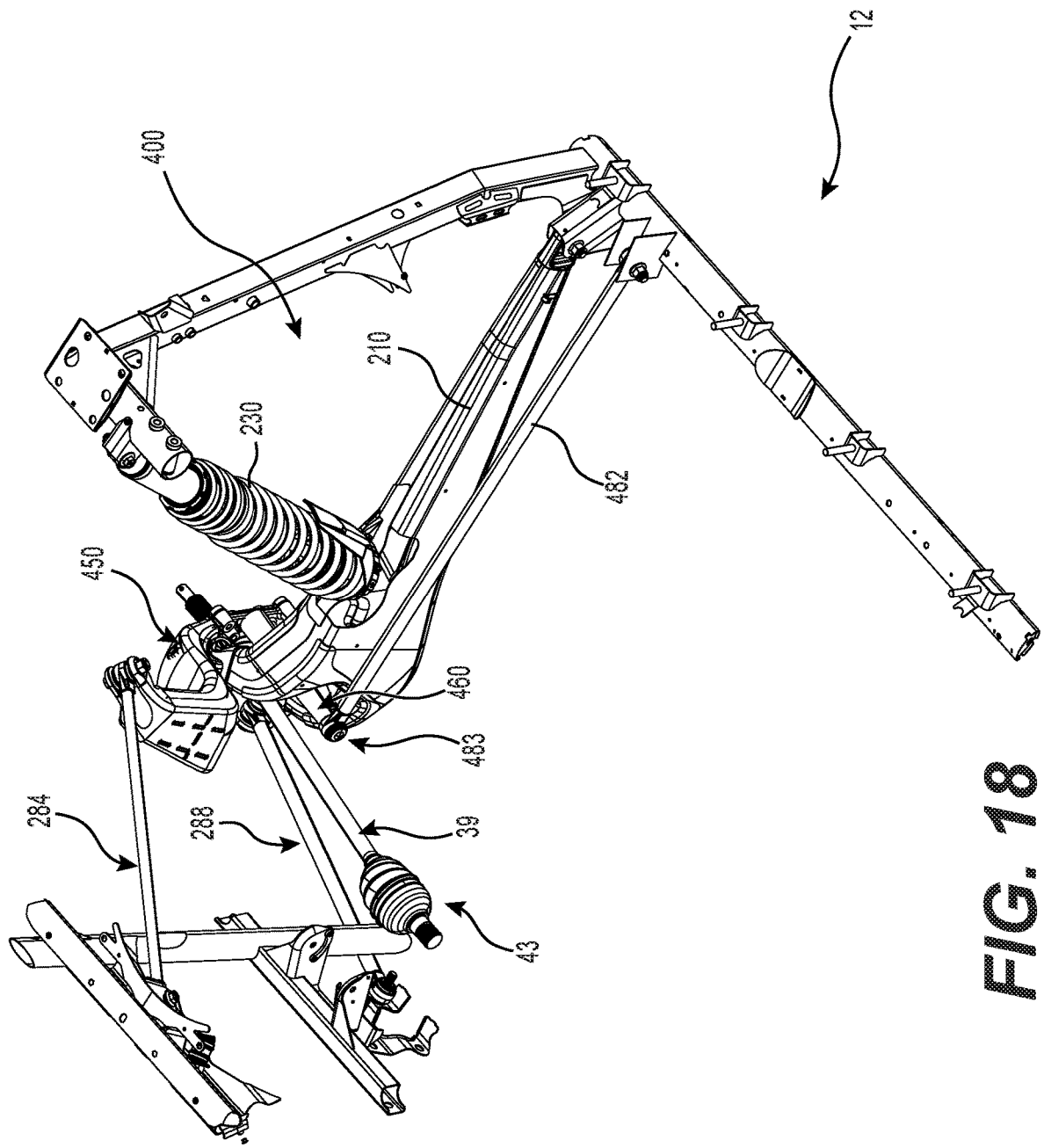
FIG. 18 is a top, front, right side perspective view of a left suspension assembly according to another non-limiting embodiment of the present technology.
Figure 19:
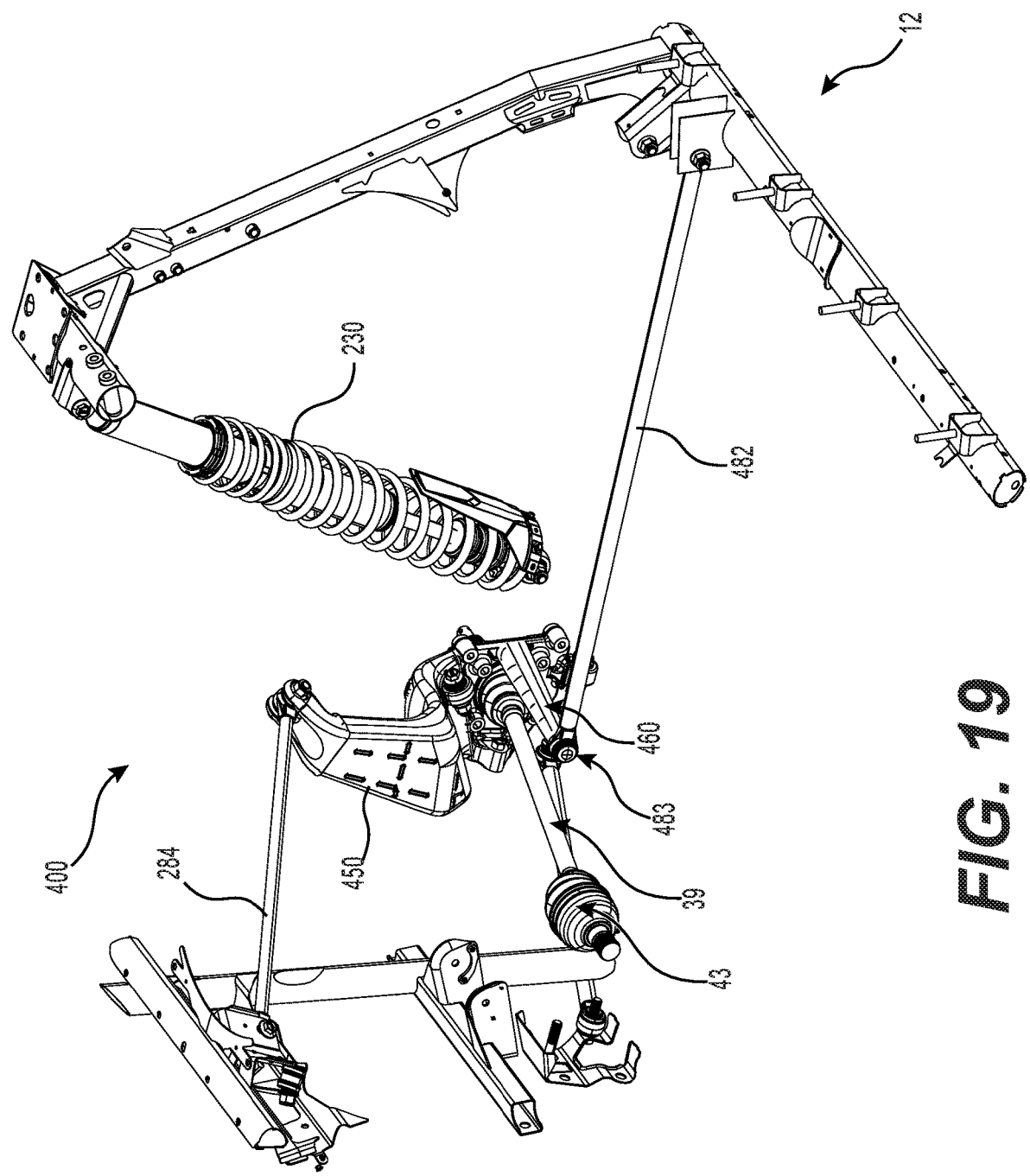
FIG. 19 is a top, front, right side perspective view of the left suspension assembly of FIG. 18, with a swing arm having been removed.
Figure 20:
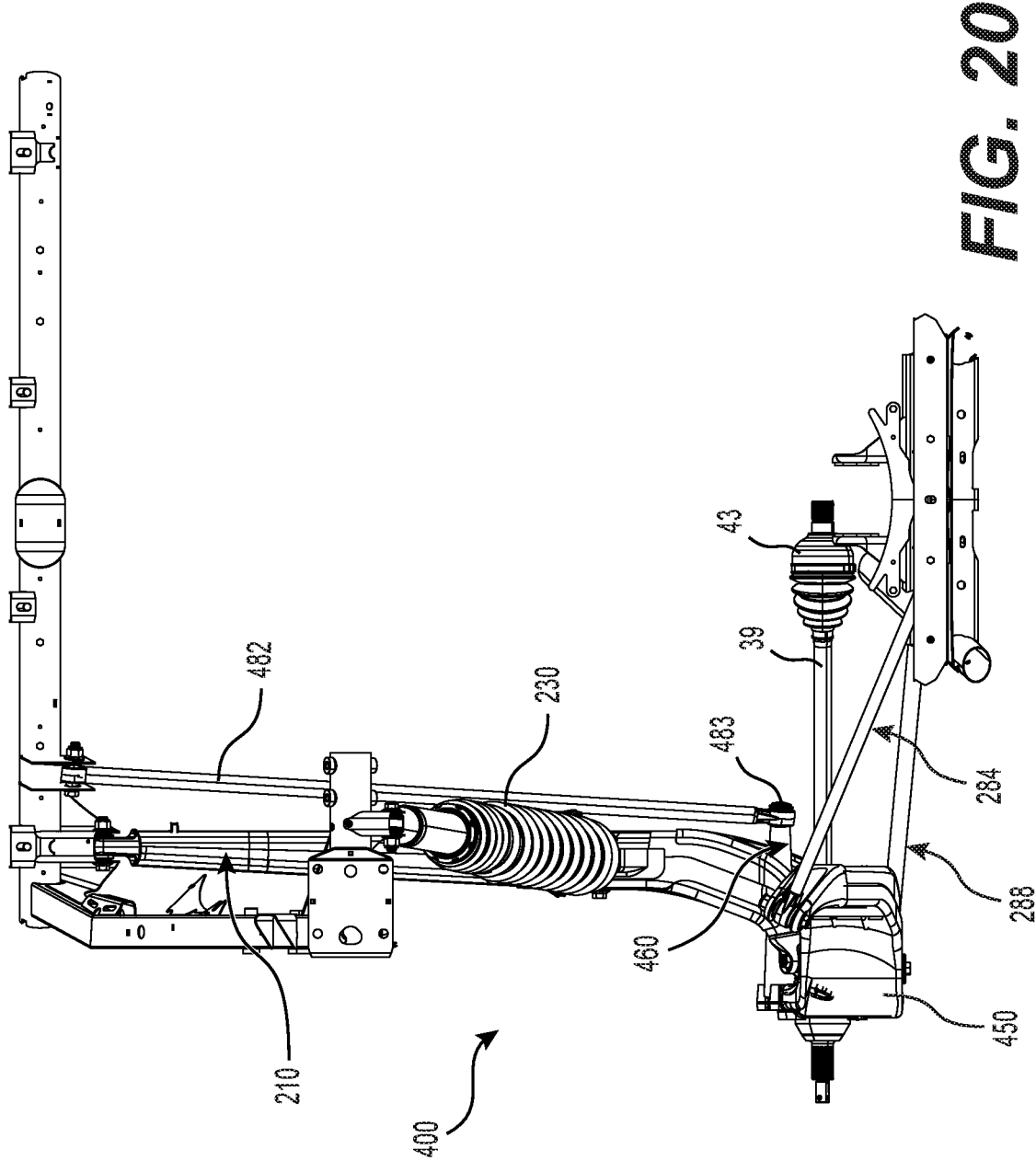
FIG. 20 is a top plan view of the left suspension assembly of FIG. 18.

With reference to FIGS. 18 to 20, another non-limiting embodiment of a left rear suspension assembly 400 in accordance with the present technology is illustrated. A corresponding right rear suspension assembly 400 being a mirror image of the left assembly 400, only the left assembly 400 is shown and described herein. Elements of the assembly 400 that are similar to those of the assembly 200 retain the same reference numeral and will generally not be described again.

The suspension assembly 400 includes a knuckle 450 for connecting the rear wheel 18 to the swing arm 210. The knuckle 450 includes a protrusion 460 for connecting to a link 482 connected between the knuckle 450 and the frame 12 (the link 282 having been removed in this embodiment). The protrusion 460 is generally cone-shaped, extending inward from a main knuckle body, although it is contemplated that the particular shape of the protrusion 460 may vary. The protrusion 460 in the illustrated embodiment is integrally formed with remaining portions of the knuckle 450. In some embodiments, the protrusion 460 could be formed separately and then rigidly affixed to the remaining portions of the knuckle 450 (for example, by welding or fastening)

The link 482 extends generally longitudinally (front to rear) in the vehicle 10, in contrast to the link 288 which extends generally laterally (left-right). The link 482 extends between the knuckle 450 and the frame 12. The link 482 has a rearward end pivotally connected to the protrusion 460 of the knuckle 450, specifically via a ball joint 483. A forward end of the link 482 is pivotally connected to the lower portion of the frame 12, in the vicinity of the front end 212 of the swing arm 210. As can be seen from at least FIG. 19, the protrusion 460 and the ball joint 483 connecting the rear end of the link 482 are disposed forward of the shaft 39.

Figure 21:
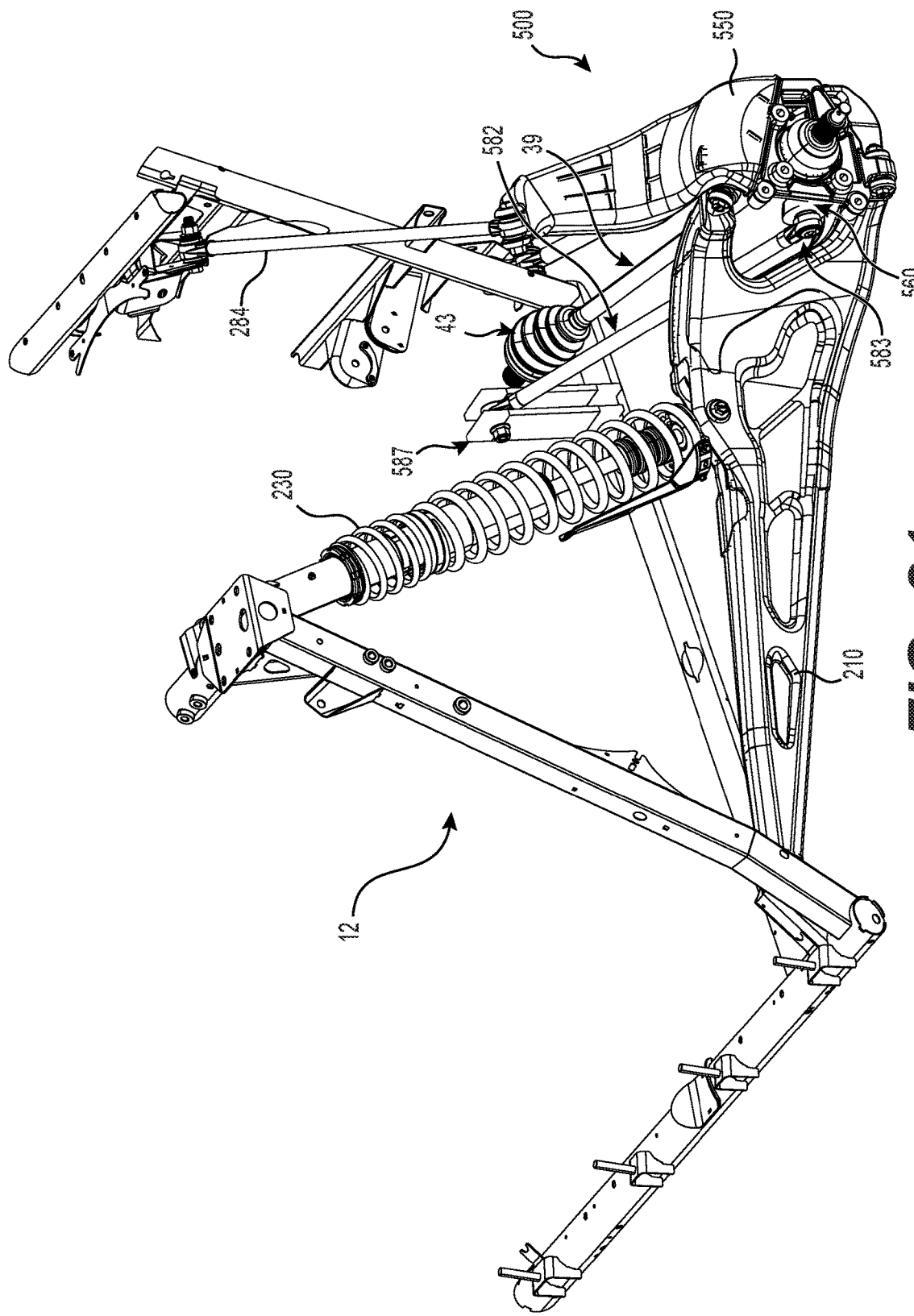
FIG. 21 is a front, right side perspective view of a left suspension assembly according to another non-limiting embodiment of the present technology.
Figure 22:
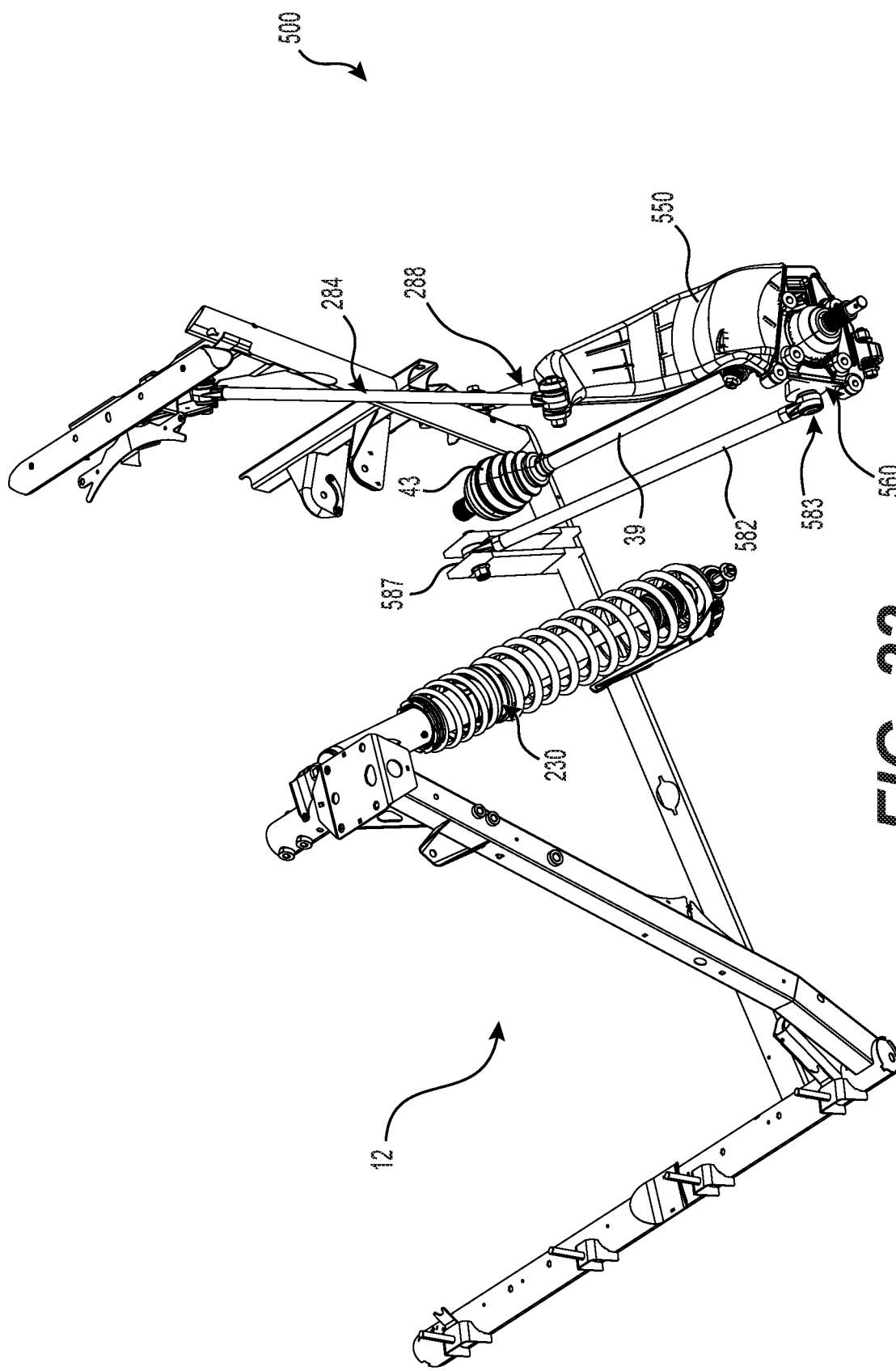
FIG. 22 is a top, front, right side perspective view of the left suspension assembly of FIG. 21, with a swing arm having been removed.
Figure 23:
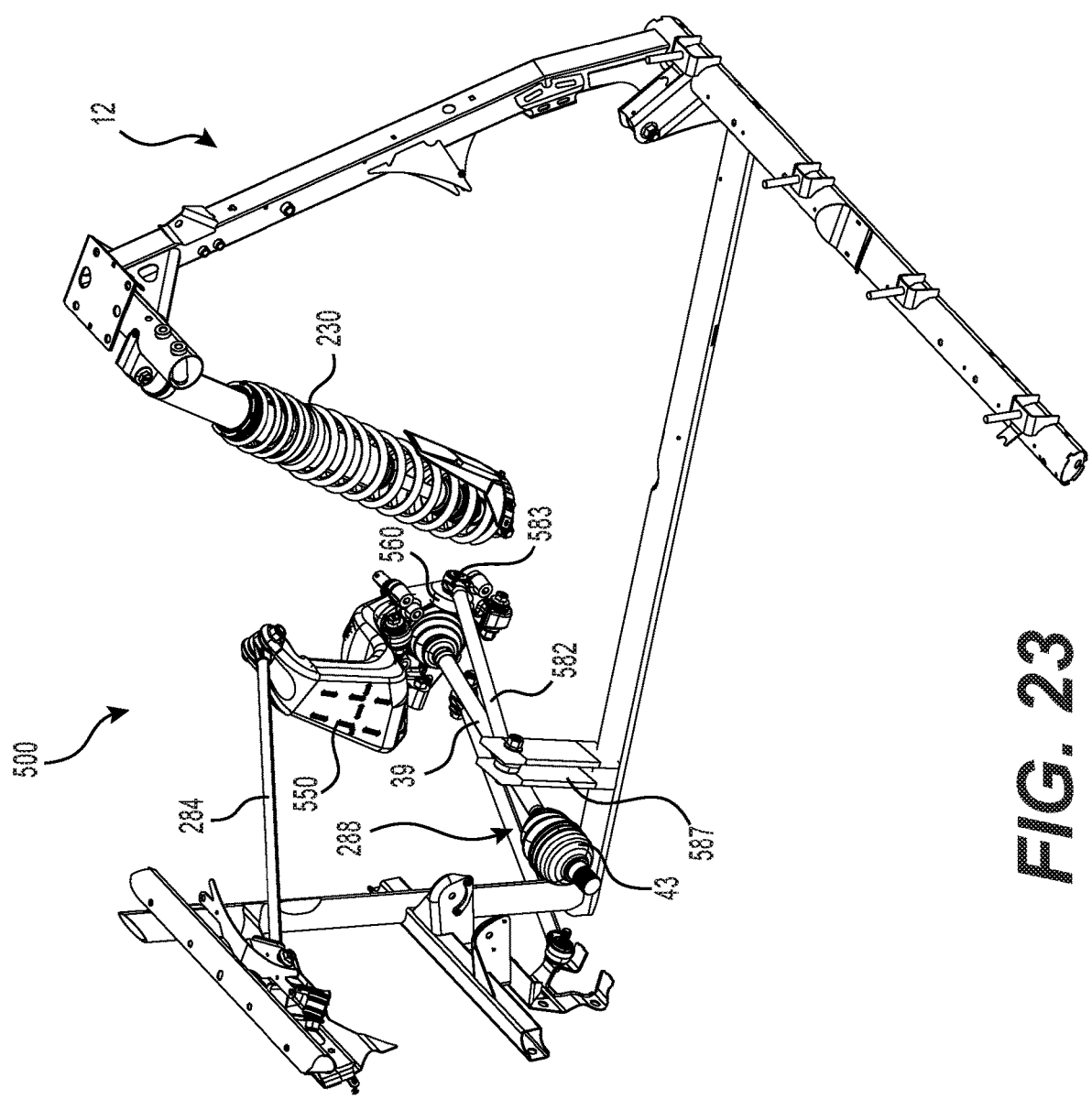
FIG. 23 is a front, left side perspective view of the left suspension assembly of FIG. 21, with the swing arm having been removed.

With reference to FIGS. 21 to 23, another non-limiting embodiment of a left rear suspension assembly 500 in accordance with the present technology is illustrated. A corresponding right rear suspension assembly 500 being a mirror image of the left assembly 500, only the left assembly 500 is shown and described herein. Elements of the assembly 500 that are similar to those of the assembly 200 retain the same reference numeral and will generally not be described again.

The suspension assembly 500 includes a knuckle 550 for connecting the rear wheel 18 to the swing arm 210. The knuckle 550 includes a protrusion 560 for connecting to a link 582 connected between the knuckle 550 and the frame 12 (the link 282 having been removed in this embodiment). The protrusion 560 is generally tab-shaped, extending inward from a main knuckle body, although it is contemplated that the particular shape of the protrusion 560 may vary. The protrusion 560 in the illustrated embodiment is integrally formed with remaining portions of the knuckle 550. In some embodiments, the protrusion 560 could be formed separately and then rigidly affixed to the remaining portions of the knuckle 550 (for example, by welding or fastening)

The link 582 extends generally laterally (left-right) in the vehicle 10, parallel to the arrangement of the link 288. The link 582 extends between the knuckle 550 and the frame 12 and connects to a frame bracket 587 extending upward from a lower portion of the frame 12, slightly forward of the CV joint (illustrated in its cover 43). The link 582 has an outward end pivotally connected to the protrusion 560 of the knuckle 550, specifically via a ball joint 583. A laterally inward end of the link 582 is pivotally connected to the bracket 587. As can be seen from the Figures, the link 582, as well as the corresponding protrusion 560 and ball joint 583, disposed forward of the shaft 39, while the link 288 is disposed rearward of the shaft 39.

The vehicle 10 and the rear suspension assemblies 200, 300, 400, 500 implemented in accordance with some non-limiting implementations of the present technology can be represented as presented in the following numbered clauses.

CLAUSE 1. A vehicle (10) comprising: a frame (12); a driver seat (24) connected to the frame (12); a front left suspension assembly (20) connected to the frame (12); a front left wheel (14) operatively connected to the front left suspension assembly (20); a front right suspension assembly (20) connected to the frame (12); a front right wheel (14) operatively connected to the front right suspension assembly (20); a rear left suspension assembly (200) connected to the frame (12); a rear left wheel (18) operatively connected to the rear left suspension assembly (200), the rear left wheel (18) having a left wheel axis (21), the rear left wheel (18) including: a rear left rim (15) having an inner rim radius (17), and a rear left tire (16) mounted to the rear left rim (15); a rear right suspension assembly (200) connected to the frame (12); a rear right wheel (18) operatively connected to the rear right suspension assembly (200), the rear right wheel (18) having a right wheel axis (21), the rear right wheel (18) including: a rear right rim (15) having the inner rim radius (17), and a rear right tire (16) mounted to the rear right rim (15); a rear gear train (35) operatively connected to the rear left wheel (18) and the rear right wheel (18); and a motor operatively connected to the rear gear train (35), the motor driving the rear right wheel (18) and the rear left wheel (18) via the rear gear train (35), each of the rear left suspension assembly (200) and the rear right suspension assembly (200) comprising: a swing arm (210) having a front end (212) pivotally connected to the frame (12); a shock absorber assembly (230) pivotally connected to the swing arm (210) at a first end (232) and pivotally connected to the frame (12) at a second end (234); a knuckle (250) pivotally connected to a rear portion of the swing arm (210), the knuckle (250) including: a first portion (252) connected to a wheel hub (19), the wheel hub (19) being operatively connected to a corresponding one of the rear right wheel (18) and the rear left wheel (18), and a second portion (254) connected to and extending generally upward from the first portion (252); a first link (282) having a laterally outward end pivotally connected to the first portion (252) of the knuckle (250) and a laterally inward end pivotally connected to the frame (12); and a second link (284) having a laterally outward end pivotally connected to the second portion (254) of the knuckle (250) and a laterally inward end pivotally connected to the frame (12), the laterally outward end of the second link (284) being distanced from a corresponding one of the right wheel axis (21) and the left wheel axis (21) by a distance (295) greater than the inner rim radius (17).

CLAUSE 2. The vehicle (10) of clause 1, further comprising a third link (288) having: a laterally outward end pivotally connected to the swing arm (210); and a laterally inward end pivotally connected to the frame (12).

CLAUSE 3. The vehicle (10) of clause 2, wherein the first link (282), the second link (284), and the third link (288) connect to the frame (12) rearward of the rear gear train (35).

CLAUSE 4. The vehicle (10) of clause 2 or 3, wherein the first link (282) and the third link (288) are disposed rearward of the rear gear train (35).

CLAUSE 5. The vehicle (10) of any one of clauses 1 to 4, further comprising a sway bar assembly (270) including: a sway bar (272); a right link (278) having a bottom end pivotally connected to the swing arm (210) of the rear right suspension assembly (200) and a top end pivotally connected to a right end of the sway bar (272); and a left link (276) having a bottom end pivotally connected to the swing arm (210) of the rear left suspension assembly (200) and a top end pivotally connected to a left end of the sway bar (272).

CLAUSE 6. The vehicle (10) of clause 5, wherein the sway bar (272) includes: a central portion (273) arranged generally horizontally left to right, a right portion (274) extending generally forward from a right end of the central portion (273), and a left portion (275) extending generally forward from a left end of the central portion (273); and the central portion (273) of the sway bar (272) is pivotally connected to a rear portion (93) of the frame (12).

CLAUSE 7. The vehicle (10) of clause 6, wherein: the frame (12) further comprises a connection bracket (95) disposed above the rear gear train (35) and the sway bar (272); and the laterally inward end of the second link (284) of each of the right and left suspension assemblies (200) are connected to the connection bracket (95).

CLAUSE 8. The vehicle (10) of any one of clauses 5 to 7, wherein the right link (278) of the sway bar assembly (270) and the left link (276) of the sway bar assembly (270) are disposed forward of the rear gear train (35).

CLAUSE 9. The vehicle (10) of any one of clauses 5 to 8, wherein: for the rear right suspension assembly (200), the right link (278) of the sway bar (272) connects to the swing arm (210) forward of the first end (232) of the shock absorber assembly (230); and for rear left suspension assembly (200), the left link (276) of the sway bar (272) connects to the swing arm (210) forward of the first end (232) of the shock absorber assembly (230).

CLAUSE 10. The vehicle (10) of any one of clauses 1 to 9, wherein: the frame (12) further comprises a connection bracket (95) disposed higher than the rear gear train (35); and the laterally inward end of the second link (284) of each of the right and left suspension assemblies (200) are connected to the connection bracket (95).

CLAUSE 11. The vehicle (10) of any one of clauses 1 to 10, wherein, for each of the rear left suspension assembly (200) and the rear right suspension assembly (200), the knuckle (250) is connected to the swing arm (210) by a first ball joint (262) and a second ball joint (264).

CLAUSE 12. The vehicle (10) of clause 11, wherein: the first ball joint (262) is disposed higher than the wheel axis (21); and the second ball joint (264) is disposed lower than the wheel axis (21).

CLAUSE 13. The vehicle (10) of any one of clauses 1 to 12, wherein, for each of the rear left suspension assembly (200) and the rear right suspension assembly (200), a top end of the second portion (254) of the knuckle (250) and the laterally outward end of the second link (284) are disposed vertically higher than the corresponding one of the rear right wheel (18) and the rear left wheel (18).

CLAUSE 14. The vehicle (10) of any one of clauses 1 to 13, wherein, for each of the rear left suspension assembly (200) and the rear right suspension assembly (200), the second portion (254) of the knuckle (250) extends vertically along an interior side of the corresponding one of the rear right wheel (18) and the rear left wheel (18).

CLAUSE 15. A rear suspension assembly (200) for supporting a wheel (18) of a vehicle (10), the rear suspension assembly (200) comprising: a swing arm (210) having a front end (212) configured for pivotally connecting to a frame (12) of the vehicle (10); a shock absorber assembly (230) pivotally connected to the swing arm (210) at a first end (232), the shock absorber assembly (230) being configured for pivotally connecting to the frame (12) at a second end (234); a knuckle (250) pivotally connected to a rear portion (214) of the swing arm (210), the knuckle (250) including: a first portion (252) configured for connecting to a wheel hub (19), and a second portion (254) connected to and extending generally upward from the first portion (252); a first link (282) having a laterally outward end pivotally connected to the first portion (252) of the knuckle (250) and a laterally inward end configured for pivotally connecting to the frame (12); and a second link (284) having a laterally outward end pivotally connected to the second portion (254) of the knuckle (250) and a laterally inward end configured for pivotally connecting to the frame (12), the laterally outward end of the second link (284) being distanced from a wheel axis (21) of the wheel (18) by a distance (295) greater than an inner rim radius (17) of the wheel (18).

CLAUSE 16. The rear suspension assembly (200) of clause 15, wherein: the first portion (252) of the knuckle (250) defines an aperture (253) therein for receiving the wheel hub (19); the aperture (253) has an aperture axis (251); and the aperture axis (251) is aligned with the wheel axis (21).

CLAUSE 17. The rear suspension assembly (200) of clause 16, wherein: an upper part of the first portion (252) of the knuckle (250) is pivotally connected to the swing arm (210) at a first point; and a lower part of the first portion (252) of the knuckle (250) is pivotally connected to the swing arm (210) at a second point.

CLAUSE 18. The rear suspension assembly (200) of clause 17, wherein a distance (295) between the aperture axis (251) and the laterally outward end of the second link (284), as connected to the second portion (254), is greater than half of a distance (265) between the first point and the second point.

CLAUSE 19. The rear suspension assembly (200) of any one of clauses 15 to 18, further comprising a third link (288) having: a laterally outward end pivotally connected to the swing arm (210); and a laterally inward end configured for pivotally connecting to the frame (12).

CLAUSE 20. The rear suspension assembly (200) of any one of clauses 15 to 19, wherein the knuckle (250) is connected to the swing arm (210) by two ball joints (262, 264).

CLAUSE 21. The rear suspension assembly (200) of any one of clauses 15 to 20, wherein: the knuckle (250) is connected to the swing arm (210) by a first ball joint (262) and a second ball joint (264); the first ball joint (262) is disposed below the wheel axis (21); and the second ball joint (264) is disposed above the wheel axis (21).

CLAUSE 22. The rear suspension assembly (200) of any one of clauses 15 to 21, wherein the second portion (254) of the knuckle (250) extends first upward, then inward, and subsequently upward from the first portion (252) of the knuckle (250).

CLAUSE 23. The rear suspension assembly (200) of clause 22, wherein: a top end of the second portion (254) of the knuckle (250) forms a bracket (257); the bracket (257) extends slightly outward from remaining parts of the second portion (254); and the laterally outward end of the second link (284) is a pivotally connected to the bracket (257).

CLAUSE 21. A vehicle (10) comprising: a frame (12); a driver seat (24) connected to the frame (12); a front left suspension assembly (20) connected to the frame (12); a front left wheel (14) operatively connected to the front left suspension assembly (20); a front right suspension assembly (20) connected to the frame (12); a front right wheel (14) operatively connected to the front right suspension assembly (20); a rear left suspension assembly (200) connected to the frame (12); a rear left wheel (18) operatively connected to the rear left suspension assembly (200), the rear left wheel (18) having a left wheel axis (21), the rear left wheel (18) including: a rear left rim (15) having an inner rim radius (17), and a rear left tire (16) mounted to the rear left rim (15); a rear right suspension assembly (200) connected to the frame (12); a rear right wheel (18) operatively connected to the rear right suspension assembly (200), the rear right wheel (18) having a right wheel axis (21), the rear right wheel (18) including: a rear right rim (15) having the inner rim radius (17), and a rear right tire (16) mounted to the rear right rim (15); a rear gear drive (35) operatively connected to the rear left wheel (18) and the rear right wheel (18); and a motor (30) operatively connected to the rear drive assembly (35), the motor (30) driving the right rear wheel (18) and the left rear wheel (18) via the rear drive assembly (35), each of the rear left suspension assembly (200) and the rear right suspension assembly (200) comprising: a swing arm (210) having a front end (212) pivotally connected to the frame (12); a shock absorber assembly (230) pivotally connected to the swing arm (210) at a first end (232) and pivotally connected to the frame (12) at a second end (234); a knuckle (250) pivotally connected to a rear portion (214) of the swing arm (210), the knuckle (250) including: a first portion (252) at least partially housed in the corresponding one of the rear right rim (15) and the rear left rim (15), and a second portion (254) extending upward from the first portion (252), a top end of the second portion (254) being vertically higher than the corresponding one of the rear right rim (15) and the rear left rim (15); and at least one link (284) having a laterally outward end pivotally connected to the knuckle (250) and a laterally inward end pivotally connected to the frame (12), the laterally outward end of the at least one link (284) being distanced from a corresponding one of the right wheel axis (21) and the left wheel axis (21) by a distance (295) greater than the inner rim radius (17).

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
a driver seat connected to the frame;
a front left suspension assembly connected to the frame;
a front left wheel operatively connected to the front left suspension assembly;
a front right suspension assembly connected to the frame;
a front right wheel operatively connected to the front right suspension assembly;
a rear left suspension assembly connected to the frame;
a rear left wheel operatively connected to the rear left suspension assembly, the rear left wheel having a left wheel axis, the rear left wheel including:
a rear left rim having an inner rim radius, and
a rear left tire mounted to the rear left rim;
a rear right suspension assembly connected to the frame;
a rear right wheel operatively connected to the rear right suspension assembly, the rear right wheel having a right wheel axis, the rear right wheel including:
a rear right rim having the inner rim radius, and
a rear right tire mounted to the rear right rim;
a rear gear train operatively connected to the rear left wheel and the rear right wheel; and
a motor operatively connected to the rear gear train, the motor driving the rear right wheel and the rear left wheel via the rear gear train,
each of the rear left suspension assembly and the rear right suspension assembly comprising:
a swing arm having a front end pivotally connected to the frame;
a shock absorber assembly pivotally connected to the swing arm at a first end and pivotally connected to the frame at a second end;
a knuckle pivotally connected to a rear portion of the swing arm, the knuckle including:
a first portion connected to a wheel hub, the wheel hub being operatively connected to a corresponding one of the rear right wheel and the rear left wheel, and
a second portion connected to and extending generally upward from the first portion;
a first link having a laterally outward end pivotally connected to the first portion of the knuckle and a laterally inward end pivotally connected to the frame; and
a second link having a laterally outward end pivotally connected to the second portion of the knuckle and a laterally inward end pivotally connected to the frame, the laterally outward end of the second link being distanced from a corresponding one of the right wheel axis and the left wheel axis by a distance greater than the inner rim radius.

2. The vehicle of claim 1, further comprising a third link having:
a laterally outward end pivotally connected to the swing arm; and
a laterally inward end pivotally connected to the frame.

3. The vehicle of claim 2, wherein the first link, the second link, and the third link connect to the frame rearward of the rear gear train.

4. The vehicle of claim 2, wherein the first link and the third link are disposed rearward of the rear gear train.

5. The vehicle of claim 1, further comprising a sway bar assembly including:
a sway bar;
a right link having a bottom end pivotally connected to the swing arm of the rear right suspension assembly and a top end pivotally connected to a right end of the sway bar; and
a left link having a bottom end pivotally connected to the swing arm of the rear left suspension assembly and a top end pivotally connected to a left end of the sway bar.

6. The vehicle of claim 5, wherein the sway bar includes:
a central portion arranged generally horizontally left to right,
a right portion extending generally forward from a right end of the central portion, and
a left portion extending generally forward from a left end of the central portion; and the central portion of the sway bar is pivotally connected to a rear portion of the frame.

7. The vehicle of claim 6, wherein:
the frame further comprises a connection bracket disposed above the rear gear train and the sway bar; and
the laterally inward end of the second link of each of the right and left suspension assemblies are connected to the connection bracket.

8. The vehicle of claim 5, wherein the right link of the sway bar assembly and the left link of the sway bar assembly are disposed forward of the rear gear train.

9. The vehicle of claim 5, wherein:
for the rear right suspension assembly, the right link of the sway bar connects to the swing arm forward of the first end of the shock absorber assembly; and
for the rear left suspension assembly, the left link of the sway bar connects to the swing arm forward of the first end of the shock absorber assembly.

10. The vehicle of claim 1, wherein:
the frame further comprises a connection bracket disposed higher than the rear gear train; and
the laterally inward end of the second link of each of the right and left suspension assemblies are connected to the connection bracket.

11. The vehicle of claim 1, wherein, for each of the rear left suspension assembly and the rear right suspension assembly, the knuckle is connected to the swing arm by a first ball joint and a second ball joint.

12. The vehicle of claim 11, wherein, for each of the rear left suspension assembly and the rear right suspension assembly:
the first ball joint is disposed higher than a corresponding one of the right and left wheel axes; and
the second ball joint is disposed lower than a corresponding one of the right and left wheel axes.

13. The vehicle of claim 1, wherein, for each of the rear left suspension assembly and the rear right suspension assembly, a top end of the second portion of the knuckle and the laterally outward end of the second link are disposed vertically higher than the corresponding one of the rear right wheel and the rear left wheel.

14. The vehicle of claim 1, wherein, for each of the rear left suspension assembly and the rear right suspension assembly, the second portion of the knuckle extends vertically along an interior side of the corresponding one of the rear right wheel and the rear left wheel.

15. The vehicle of claim 1, wherein each of the rear left suspension assembly and the rear right suspension assembly is arranged to form:
a positive spindle length;
a negative scrub radius; and
a negative trail.

16. A rear suspension assembly for supporting a wheel of a vehicle, the rear suspension assembly comprising:
a swing arm having a front end configured for pivotally connecting to a frame of the vehicle;
a shock absorber assembly pivotally connected to the swing arm at a first end, the shock absorber assembly being configured for pivotally connecting to the frame at a second end;
a knuckle pivotally connected to a rear portion of the swing arm, the knuckle including:
a first portion configured for connecting to a wheel hub, and
a second portion connected to and extending generally upward from the first portion;
a first link having a laterally outward end pivotally connected to the first portion of the knuckle and a laterally inward end configured for pivotally connecting to the frame; and
a second link having a laterally outward end pivotally connected to the second portion of the knuckle and a laterally inward end configured for pivotally connecting to the frame, the laterally outward end of the second link being distanced from a wheel axis of the wheel by a distance greater than an inner rim radius of the wheel.

17. The rear suspension assembly of claim 16, wherein:
the first portion of the knuckle defines an aperture therein for receiving the wheel hub;
the aperture has an aperture axis; and
the aperture axis is aligned with the wheel axis.

18. The rear suspension assembly of claim 17, wherein:
an upper part of the first portion of the knuckle is pivotally connected to the swing arm at a first point; and
a lower part of the first portion of the knuckle is pivotally connected to the swing arm at a second point.

19. The rear suspension assembly of claim 18, wherein a distance between the aperture axis and the laterally outward end of the second link, as connected to the second portion, is greater than half of a distance between the first point and the second point.

20. The rear suspension assembly of claim 16, further comprising a third link having:
a laterally outward end pivotally connected to the swing arm; and
a laterally inward end configured for pivotally connecting to the frame.

21. The rear suspension assembly of claim 16, wherein the knuckle is connected to the swing arm by two ball joints.

22. The rear suspension assembly of claim 16, wherein:
the knuckle is connected to the swing arm by a first ball joint and a second ball joint;
the first ball joint is disposed below the wheel axis; and
the second ball joint is disposed above the wheel axis.

23. The rear suspension assembly of claim 16, wherein the second portion of the knuckle extends first upward, then inward, and subsequently upward from the first portion of the knuckle.

24. The rear suspension assembly of claim 23, wherein:
a top end of the second portion of the knuckle forms a bracket;
the bracket extends slightly outward from remaining parts of the second portion; and
the laterally outward end of the second link is pivotally connected to the bracket.

25. The rear suspension assembly of claim 16, wherein the suspension assembly is arranged to form:
a positive spindle length;
a negative scrub radius; and
a negative trail.

26. A vehicle comprising:
a frame;
a driver seat connected to the frame;
a front left suspension assembly connected to the frame;
a front left wheel operatively connected to the front left suspension assembly;
a front right suspension assembly connected to the frame;
a front right wheel operatively connected to the front right suspension assembly;
a rear left suspension assembly connected to the frame;
a rear left wheel operatively connected to the rear left suspension assembly, the rear left wheel having a left wheel axis, the rear left wheel including:

a rear left rim having an inner rim radius, and
a rear left tire mounted to the rear left rim;
a rear right suspension assembly connected to the frame;
a rear right wheel operatively connected to the rear right suspension assembly, the rear right wheel having a right wheel axis, the rear right wheel including:
a rear right rim having the inner rim radius, and
a rear right tire mounted to the rear right rim;
a rear gear drive operatively connected to the rear left wheel and the rear right wheel; and
a motor operatively connected to the rear gear drive, the motor driving the right rear wheel and the left rear wheel via the rear gear drive,
each of the rear left suspension assembly and the rear right suspension assembly comprising:
a swing arm having a front end pivotally connected to the frame;
a shock absorber assembly pivotally connected to the swing arm at a first end and pivotally connected to the frame at a second end;
a knuckle pivotally connected to a rear portion of the swing arm, the knuckle including:
a first portion at least partially housed in the corresponding one of the rear right rim and the rear left rim, and
a second portion extending upward from the first portion, a top end of the second portion being vertically higher than the corresponding one of the rear right rim and the rear left rim; and
at least one link having a laterally outward end pivotally connected to the knuckle and a laterally inward end pivotally connected to the frame, the laterally outward end of the at least one link being distanced from a corresponding one of the right wheel axis and the left wheel axis by a distance greater than the inner rim radius.

* * * * *